(12) United States Patent
Kim et al.

(10) Patent No.: US 11,516,700 B2
(45) Date of Patent: Nov. 29, 2022

(54) METHOD AND DEVICE FOR TRANSMITTING AND RECEIVING DATA IN WIRELESS COMMUNICATION SYSTEM

(71) Applicant: Samsung Electronics Co., Ltd., Gyeonggi-do (KR)

(72) Inventors: Sang-Bum Kim, Gyeonggi-do (KR); Jae-Hyuk Jang, Gyeonggi-do (KR); Soeng-Hun Kim, Gyeonggi-do (KR); Anil Agiwal, Gyeonggi-do (KR); Seung-Ri Jin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 206 days.

(21) Appl. No.: 16/647,685

(22) PCT Filed: Sep. 7, 2018

(86) PCT No.: PCT/KR2018/010511
§ 371 (c)(1),
(2) Date: Mar. 16, 2020

(87) PCT Pub. No.: WO2019/054702
PCT Pub. Date: Mar. 21, 2019

(65) Prior Publication Data
US 2020/0236580 A1   Jul. 23, 2020

(30) Foreign Application Priority Data

Sep. 15, 2017 (KR) .................. 10-2017-0118689
Sep. 21, 2017 (KR) .................. 10-2017-0121911

(51) Int. Cl.
*H04W 28/02* (2009.01)
*H04L 1/00* (2006.01)
(Continued)

(52) U.S. Cl.
CPC ....... *H04W 28/0278* (2013.01); *H04L 1/0008* (2013.01); *H04W 72/0413* (2013.01); *H04W 74/0833* (2013.01)

(58) Field of Classification Search
None
See application file for complete search history.

(56) References Cited

U.S. PATENT DOCUMENTS

| 2010/0177788 | A1 | 7/2010 | Chun et al. |
| 2012/0188956 | A1 | 7/2012 | Dong |
| 2013/0272319 | A1* | 10/2013 | Chun ............. H04W 8/26 370/474 |

(Continued)

FOREIGN PATENT DOCUMENTS

| EP | 3 576 480 | 12/2019 |
| KR | 1020170003714 | 1/2017 |

(Continued)

OTHER PUBLICATIONS

R2-1707721 Huawei, HiSilicon "Flexible length BSR format" 3GPP WG2 NR #99 Aug. 21-25, 2017 (Year: 2017).*
R2-1709149 LG "BSR format with increased LCG" 3GPP WG2 NR #99 Aug. 21-25, 2017 (Year: 2017).*
R2-1706368 CATT "BSR MAC CE format" 3GPP WG2 NR #99 Aug. 21-25, 2017 (Year: 2017).*

(Continued)

*Primary Examiner* — Basil Ma
(74) *Attorney, Agent, or Firm* — The Farrell Law Firm, P.C.

(57) ABSTRACT

Disclosed is a 5G or pre-5G communication system for supporting a data transmission rate higher than that of a 4G communication system such as long term evolution (LTE). Disclosed is a method by which a terminal transmits a buffer status report (BSR) in a communication system, comprising the steps of: allocating an uplink resource from a base (Continued)

station; comparing the number of padding bits with a value obtained by summing the size of the BSR and the size of a sub-header of the BSR; and transmitting, to the base station according to the comparison result, the BSR including information indicating the presence or absence of a field representing a buffer size for at least one logical channel group (LCG).

16 Claims, 19 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2015/0304966 A1 | 10/2015 | Park et al. | |
| 2017/0086219 A1 | 3/2017 | Lee et al. | |
| 2018/0368023 A1* | 12/2018 | Hong | H04W 72/0413 |

FOREIGN PATENT DOCUMENTS

| | | |
|---|---|---|
| KR | 1020170004962 | 1/2017 |
| KR | 1020180015589 | 2/2018 |

OTHER PUBLICATIONS

R2-1709239 Samsung 3GPP WG2 NR #99 "Truncated BSR Operation" (Year: 2017).*
PCT/ISA/210 Search Report issued on PCT/KR2018/010511, pp. 13.
PCT/ISA/237 Written Opinion issued on PCT/KR2018/010511, pp. 5.
LG Electronics Inc., "BSR format with increased LCG", 3GPP TSG-RAN WG2 Meeting #99, R2-1709149, Berlin, Germany, Aug. 12, 2017, pp. 5.
LTE_feMTC-Core, "Introduction of Release Assistance Indication", 3GPP TSG-RAN2 Meeting #99, R2-1709991, Berlin, Germany, Sep. 4, 2017, pp. 5.
Huawei, HiSilicon, "Flexible Length BSR Format", R2-1707721, 3GPP TSG-RAN WG2 NR #99, Aug. 21-25, 2017, 5 pages.
Samsung, "Truncated BSR Operation", R2-1709239, 3GPP TSG-RAN WG2#99 Meeting, Aug. 21-25, 2017, 3 pages.
CATT, "BSR MAC CE Format", R2-1706368, 3GPP TSG-RAN WG2 Meeting #NR AH2, Jun. 27-29, 2017, 4 pages.
European Search Report dated Aug. 11, 2020 issued in counterpart application No. 18855574.2-1215, 13 pages.
Ericsson, "BSR Formats in NT", R2-1708349, 3GPP TSG-RAN WG2 #99, Aug. 21-25, 2017, 4 pages.
Korean Office Action dated Aug. 25, 2021 issued in counterpart application No. 10-2017-0121911, 9 pages.

* cited by examiner

METHOD AND DEVICE FOR TRANSMITTING AND RECEIVING DATA IN WIRELESS COMMUNICATION SYSTEM

PRIORITY

This application is a National Phase Entry of International Application No. PCT/KR2018/010511, which was filed on Sep. 7, 2018, and claims priority to Korean Patent Application Nos. 10-2017-0118689 and 10-2017-0121911, which were filed on Sep. 15, 2017 and Sep. 21, 2017, respectively, the content of each of which is incorporated herein by reference.

TECHNICAL FIELD

Various embodiments of the disclosure relate to a method and a device for transmitting and receiving data in a wireless communication system and, more particularly, to a method and a device for transmitting and receiving control information to transmit and receive data in a wireless communication system.

BACKGROUND ART

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), an array antenna, analog beam-forming, and a large scale antenna are discussed to mitigate a propagation path loss in the mmWave band and increase a propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

In a cellular system, it is possible to request connection establishment with a network through a random access process. For example, random access may be performed in various situations, such as when a terminal intends to establish a radio link in initial access, when a terminal attempts to reestablish a radio link after a radio link failure, or when a terminal intends to achieve uplink synchronization with a new cell after a handover.

Even though a terminal performs random access, the random access may fail. Here, the terminal reattempts random access. In an environment where a plurality of terminals performs wireless communication with a base station, it is required to properly control a reattempt at random access.

A terminal operates a data buffer in wireless data transmission and reception with a base station. Efficient management of the data buffer may be associated with data transmission and reception efficiency.

DETAILED DESCRIPTION OF THE INVENTION

Technical Problem

The disclosure provides a method and a device for transmitting and receiving data in a wireless communication system in order to efficiently manage wireless data transmission and reception.

Technical Solution

A terminal according to an embodiment of the disclosure may include a transceiver and a processor to control the transceiver to receive backoff-related information from a base station and to perform random access on the basis of the received backoff-related information.

A terminal according to another embodiment of the disclosure may include a transceiver and a processor to control the transceiver to transmit a preamble about system information to a base station and to receive a random access response corresponding to the preamble.

A terminal according to still another embodiment of the disclosure may include a transceiver and a processor to control the transceiver to transmit buffer status information and to receive uplink resource allocation information configured on the basis of the buffer status information.

Advantageous Effects

According to the disclosure, as described above, it is possible to significantly improve the efficiency of random access.

Further, according to the disclosure, as described above, it is possible to efficiently manage, transmit, and receive the buffer status of a terminal.

MODE FOR CARRYING OUT THE INVENTION

In the following description of the disclosure, a detailed description of known configurations or functions incorporated herein will be omitted when it is determined that the detailed description may make the subject matter of the disclosure unclear. Hereinafter, embodiments of the disclosure will be described with reference to the accompanying drawings.

As used herein, terms referring to access nodes, terms referring to network entities, terms referring to messages, terms referring to interfaces between network entities, terms referring to various pieces of identification information, and the like are used for convenience of explanation. Accordingly, the disclosure is not limited to the following terms and other terms having the same technical meaning may be used.

For convenience, the disclosure will be described using terms and names defined in the 3rd Generation Partnership Project Long-Term Evolution (3GPP LTE) standard, which is the latest standard among existing communication standards. However, the disclosure may not be limited by the terms and names, and may be equally applied to a system that is based on another standard. In particular, the disclosure can be applied to 3GPP NR (new radio: fifth-generation mobile communication standard).

In various embodiments of the disclosure, when an operation is described as being performed by a terminal, a base station, or various entities, the same operation may be construed as being performed by at least one processor, a controller, a transceiver, or the like included in the terminal, the base station, or various entities.

Figure 1:
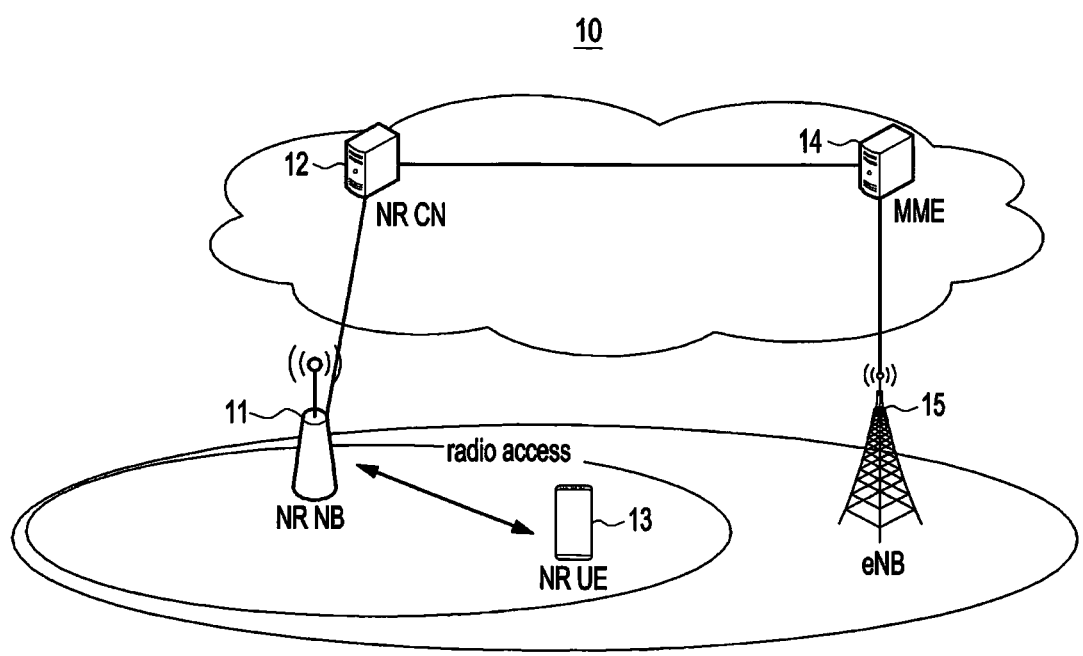
FIG. 1 illustrates a next-generation mobile communication system according to an embodiment of the disclosure.

FIG. 1 illustrates a next-generation mobile communication system according to an embodiment of the disclosure.

Referring to FIG. 1, a radio access network 10 may include a next-generation mobile communication system 10. The next-generation mobile communication system 10 may include at least a new radio node B (hereinafter, NR NB) 11 and a new radio core network (NR CN) 12. A new radio user equipment (hereinafter, NR UE or UE) may be connected to an external network through the NR NB 11 and the NR CN 12.

For example, the NR NB 11 corresponds to an evolved node B (eNB) of an LTE system. The NR NB 11 may be connected with the NR UE 13 in a radio channel. The NR NB 11 can provide higher levels of service than the node B.

In the next-generation mobile communication system 10, most (or all) user traffic may be serviced through a shared channel. Accordingly, in the next-generation mobile communication system 10, an element (or device) for collecting and scheduling state information, such as buffer statuses, available transmission power states, and channel states of UEs, is required. This scheduling may be handled by the NR NB 11.

Generally, one NR NB 11 may control a plurality of cells. The next-generation mobile communication system 10 may have a bandwidth corresponding to the maximum LTE bandwidth or greater in order to implement ultrahigh-speed data transmission compared to LTE. The next-generation mobile communication system 10 may use orthogonal frequency division multiplexing (hereinafter, OFDM) as a radio access technology. Further, the next-generation mobile communication system 10 may use a beamforming technology. In addition, the next-generation mobile communication system 10 may adopt an adaptive modulation and coding (hereinafter, AMC) scheme that determines a modulation scheme and a channel coding rate according to the channel state of the UE 13. The NR CN 12 may perform functions of mobility support, bearer setup, and quality of service (QoS) setup. The NR CN 12 may be a device that performs not only a mobility management function for a UE but also various control functions. The NR CN 12 may be connected to a plurality of base stations. The next-generation mobile communication system 10 may also interwork with an LTE system. The NR CN 12 may be connected to an MME 14 through a network interface. The MME 14 may be connected to an eNB 15, which is an existing base station.

Figure 2:
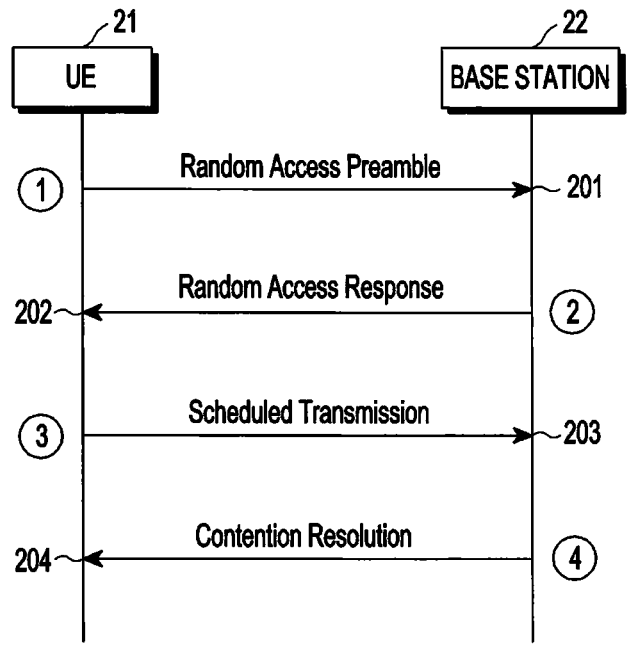
FIG. 2 is a flowchart illustrating a random access process according to an embodiment of the disclosure.

FIG. 2 is a flowchart illustrating a random access process according to an embodiment of the disclosure;

Random access may be performed when uplink synchronization is performed or data is transmitted. For example, random access may be performed when switching from a standby mode to a connected mode, performing RRC re-establishment, performing a handover, and starting uplink and downlink data. A UE 21 may receive a dedicated preamble from a base station 22. In this case, the UE 21 may transmit a preamble by applying the preamble. Otherwise, the UE 21 may select one of two preamble groups and may select a preamble belonging to the selected group. In this case, the selected preamble may be transmitted to the base station 22.

For example, it is assumed that there are group A and group B. When a channel quality state is higher than a specified threshold value and the size of Msg3 is greater than a specified threshold value, the UE 21 may select a preamble belonging to group A. Otherwise, the UE 21 selects a preamble belonging to group B.

When the UE 21 transmits the preamble in an nth subframe (201), a random access response (RAR) window may start from an n+3rd subframe. In addition, the UE 21 may monitor whether a RAR is transmitted within a time period of the window (202). Here, scheduling information about the RAR may be indicated by a random access-radio network temporary identifier (RA-RNTI) of a PDCCH. The RA-RNTI may be derived using the position of a radio resource, used to transmit the preamble, on time and frequency axes. The RAR may include a backoff indicator (BI), an RAPID, a timing advance command, a UL grant, and a temporary C-RNTI. The BI may be used for controlling the overload of a corresponding cell.

For example, when the UE 21 fails in the random access, the UE 21 may reattempt random access after waiting for a backoff time derived from the value of the BI.

The value of the BI may or may not be provided from the base station 22. When the value of the BI is not provided, the UE 21 may immediately reattempt random access without the backoff time. When the RAR is successfully received in the RAR window, the UE 21 may transmit Msg3 using information about the UL grant included in the RAR (203). Here, Msg3 may include different pieces of information according to the purpose of random access. Table 1 illustrates an example of information included in Msg3 (hereinafter, Table 1 is an example of information included in Msg3).

TABLE 1

| Case | Message 3 Contents |
| --- | --- |
| RRC connection setup | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

When the RAR is received in the nth subframe, Msg3 may be transmitted in an n+6th subframe. Here, HARQ may be applied from Msg3.

After transmitting the Msg3, the UE 21 may operate a timer. In this case, the UE 21 may monitor a contention resolution (CR) message until the timer expires (204). The CR message may include not only a CR MAC CE but also an RRC connection setup message or an RRC connection reestablishment message according to the purpose of random access.

Figure 3:
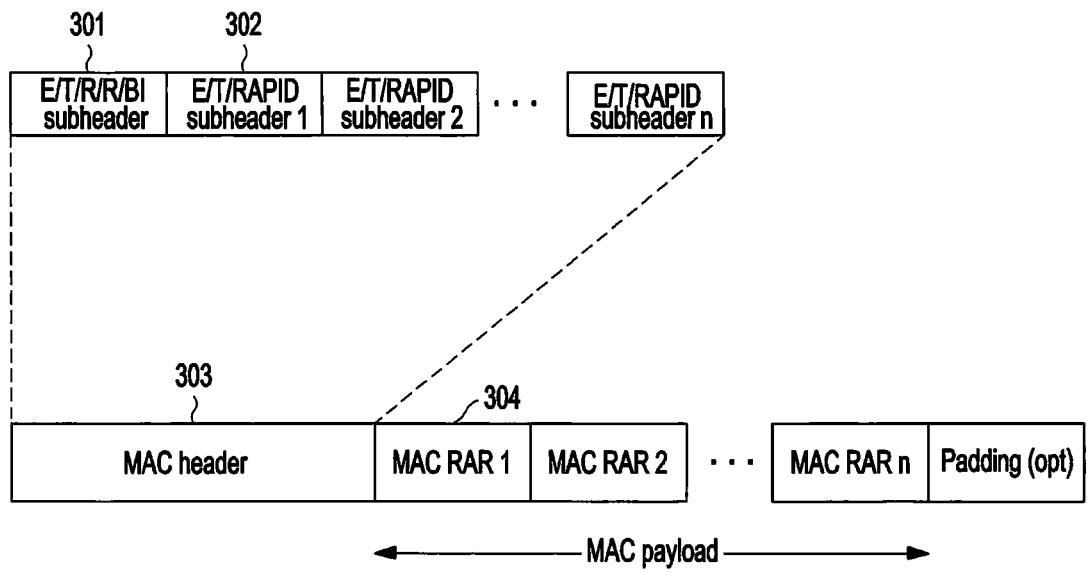
FIG. 3 illustrates the configuration of a random access response message according to an embodiment of the disclosure.

FIG. 3 illustrates the configuration of a random access response message according to an embodiment of the disclosure.

For example, in an LTE mobile communication system, a RAR includes one or more subheaders and one or more MAC RARs. Here, the RAR may include a MAC header 303 including one or more subheaders. In this case, the MAC header may be located at the beginning of the RAR.

Some of the subheaders may include a BI 301. In this case, there is no MAC RAR corresponding to the subheader. In addition, there may be one MAC RAR 304 corresponding to subheaders 302 including the ID of a preamble.

Figure 4:
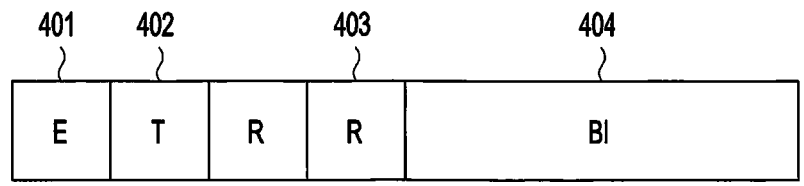
FIG. 4 illustrates an E/T/R/R/BI MAC subheader according to an embodiment of the disclosure.

FIG. 4 illustrates an E/T/R/R/BI MAC subheader according to an embodiment of the disclosure.

According to an embodiment of the disclosure, an E field 401 may indicate whether a different MAC subheader exists. A T field 402 may indicate whether the subheader includes a BI or whether the subheader includes a random access ID (RAPID). An R field 403 is, for example, a reserved bit. A BI field 404 may be used to derive a backoff time and may have a total size of 4 bits. For example, in LTE technology, one random access response message may include one subheader including a BI field.

For example, in the LTE technology, only one BI subheader may exist. Further, in the LTE technology, the same BI value may be applied regardless of conditions of random access or random access in a specific event. In another example, the next-generation mobile communication system 10 may apply different BI values according to various conditions or events when random access fails.

According to an embodiment of the disclosure, an access category and a PREAMBLE_TRANSMISSION_COUNTER value may be considered as a particular condition or event.

For example, in the LTE technology, ACDC, which is a barring mechanism, may provide barring configuration information for each category corresponding to one application.

In another example, the next-generation mobile communication system 10 proposes a category-based access control scheme similar to the existing ACDC. Here, a significant difference between the category-based access control scheme and the existing ACDC is that a category may correspond not only to an application but also to factors other than the application, for example, a service type, a call type, a UE type, a user group, a signaling type, a slice type, or a combination of these factors. That is, the category-based access control scheme may control whether to approve accesses belonging to the other factors.

For example, the barring mechanism of the next-generation mobile communication system 10 may be classified into two types of categories.

An example of one type is a standardized access category. Here, the category is a category defined at the RAN level, that is, is specified in the standard document. For example, a category corresponding to an emergency may be included in standardized access categories. All accesses may correspond to at least one of standardized access categories.

An example of the other type is a non-standardized access category. Here, the category is defined outside the 3GPP and is not specified in the standard document. Thus, the category is characteristically the same as the category in the existing ACDC. For example, an access triggered by a UE non-access stratum (NAS) may not be mapped to the non-standardized access category.

For example, an operator server may provide non-standardized category information to the UE NAS through NAS signaling or application-level data transmission. Here, the information may indicate which element, such as an application, each non-standardized category corresponds to. A base station may provide UEs with a category list providing barring configuration information and barring configuration information corresponding to each category using system information. In addition, a UE AS may transmit the category list, provided by the base station, to a UE NAS. The UE NAS may map a triggered access to one category according to a predefined rule. Further, the UE NAS may transmit the mapped category, along with a service request, to the UE AS. The UE AS may determine whether the access triggered by the UE NAS is allowed using the barring configuration information (barring check).

According to an embodiment of the disclosure, a base station may provide BI values corresponding to one or more particular access categories. Accordingly, unlike in the existing LTE, the base station may provide one or more BI values to the UE. Here, access category information corresponding to a BI may be indicated using the system information or a particular field of a BI subheader. In this case, this information may be indicated via a combination of the system information and the BI subheader.

A UE may select a BI to apply according to an access category corresponding to an access that triggers a random access operation, which makes it possible to apply a differential backoff time to a particular access. For example, a shorter backoff time may be set for an access of higher importance than other accesses. When the BI corresponding to the access category is not provided from the base station, a general BI value may be applied.

After transmitting a preamble, when the UE fails to receive a random access response message within a specified time window or receives a random access response message not including the ID of the transmitted preamble, the UE may determine that random access has failed. In this case, the UE may increase PREAMBLE_TRANSMISSION_COUNTER by one. When the value of the counter reaches preambleTransMax+1, the UE may report a random access problem to an upper layer. Here, the value of preambleTransMax may be signaled from the base station. For example, a large value of the PREAMBLE_TRANSMISSION_COUNTER may mean that the UE has failed random access a plurality of times.

According to an embodiment of the disclosure, a BI value corresponding to PREAMBLE_TRANSMISSION_COUNTER may be provided. When random access fails a plurality of times, which may mean that there is a long delay until access is successful, it is necessary to provide a differential BI value for a UE that has failed in random access a plurality of times. For example, when the base station provides a BI value corresponding to a PREAMBLE_TRANSMISSION_COUNTER value of 3, the UE may apply the provided BI value when random access has failed and thus the PREAMBLE_TRANSMISSION_COUNTER value is 3 or greater.

First Embodiment

According to a first embodiment, when one or more BIs corresponding to various conditions or events are provided, an additional field may be defined in a BI subheader of an MAC PDU in order to indicate a plurality of BIs.

Figure 5A:
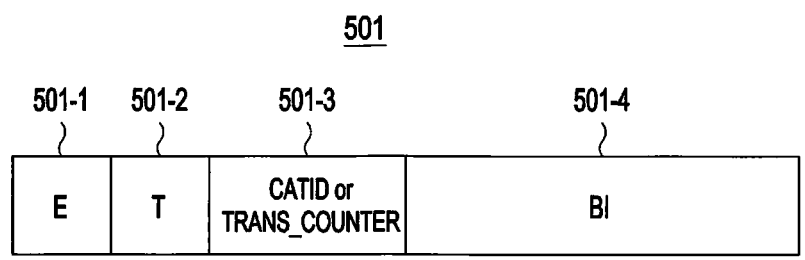
FIG. 5A illustrates a first format according to an embodiment of the disclosure.

FIG. 5A illustrates a first format according to an embodiment of the disclosure.

Specifically, FIG. 5A illustrates a first format 501 and a second format 502 including a BI field proposed in the first embodiment.

FIG. 5A illustrates the first format including the BI field according to the embodiment of the disclosure. Here, a one-bit E field 501-1 and a one-bit T field 501-2 may perform the same functions as those having the equivalent terms in LTE. For example, the E field may indicate whether a next subheader exists, and the T field may indicate whether the subheader is a BI subheader or a subheader corresponding to a MAC RAR.

The first format 501 may include a field 501-3 including various conditions or event values after the E field and the T field. For example, an access category index value or a PREAMBLE_TRANSMISSION_COUNTER value may be inserted. In this case, a BI field 501-4 including a backoff indicator corresponding to a condition or event value may be included after the field 501-3.

According to an embodiment of the disclosure, the size of the field including the condition or event value 501-3 may be two bits, and the size of the BI field 501-4 may be four bits. According to another embodiment of the disclosure, the field including the condition or event value 501-3 and the BI field 501-4 may be defined as respective values determined within a total of six bits. In one example, the order of the field including the condition or event value 501-3 and the BI field 501-4 may be changed.

Figure 5B:
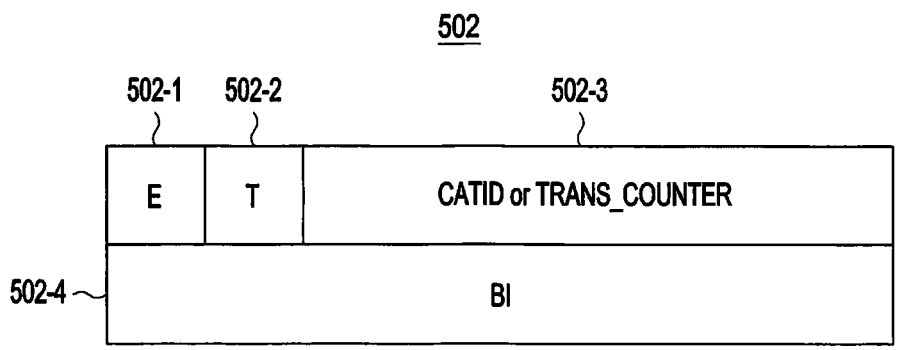
FIG. 5B illustrates a second format according to an embodiment of the disclosure.

FIG. 5B illustrates a second format according to an embodiment of the disclosure.

For example, in the first format, the field 501-3 indicating a condition or an event and the BI field 501-4 cannot exceed a total of six bits. For example, when the size of the field 501-3 indicating the condition or event is determined to be two bits, a total of four conditions or events can be indicated. For example, this condition may be exceeded in a real wireless environment.

Accordingly, the second format according to the embodiment of the disclosure may allocate a greater number of bits to indicate a condition or an event. For example, a subheader including a two-byte BI field is defined, in which six bits may be allocated to indicate a condition or event.

Except for this, as in the first format, an E field 502-1 and a T field 502-2 may perform the same functions as those having the equivalent terms in LTE. For example, the first format may include a field 502-3 indicating a condition or an event after the E field 502-1 and the T field 502-2. Further, the first format may include a BI field 502-4 including a backoff indicator corresponding to the condition or event value.

According to an embodiment of the disclosure, the size of the field 502-3 including the condition or event value may be set to six bits, and the size of the BI field 502-4 may be set to eight bits. Alternatively, the field 502-3 including the condition or event value and the BI field 502-4 may be defined as respective values determined within a total of 14 bits.

Figure 5C:
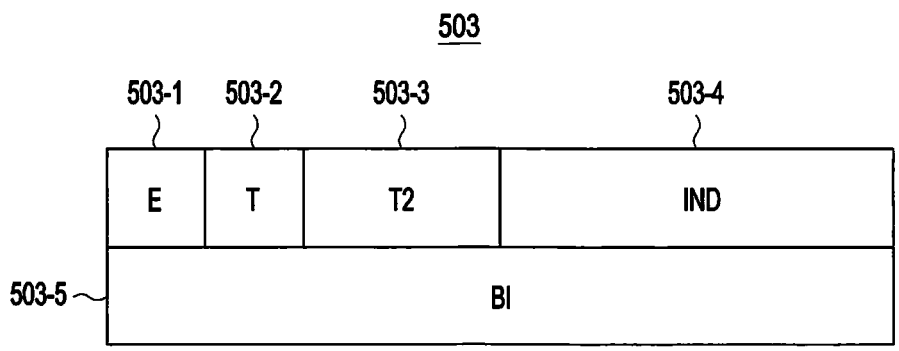
FIG. 5C illustrates a third format according to an embodiment of the disclosure.

FIG. 5C illustrates a third format according to an embodiment of the disclosure.

Specifically, FIG. 5C illustrates the third format including a BI field proposed in the first embodiment. The order of fields included in the format may be changed.

According to an embodiment of the disclosure, the first format and the second format may be suitable to indicate a condition or an event belonging to a single category. In a real environment, a condition or event belonging to various categories may be considered.

Accordingly, the third format according to the embodiment of the disclosure may be proposed. The third format may include an E field 503-1, a T field 503-2, a T2 field 503-3, an IND field 503-4, and a BI field 503-5. For example, the T2 field 503-3 may indicate a particular category, the IND field 503-4 may indicate a condition or event, and the BI field 503-5 may include a backoff indicator corresponding to a condition or event in the indicated category. For example, the T2 field may indicate an access category or PREAMBLE_TRANSMISSION_COUNTER as the category of the condition or event indicated by the IND field. Further, the IND field may include an access category index value or a PREAMBLE_TRANSMISSION_COUNTER value.

According to an embodiment of the disclosure, the T2 field 503-3, the IND field 503-4, and the BI field 503-5 may be set to two bits, four bits, and eight bits, respectively.

Alternatively, the T2 field 503-3, the ND field 503-4, and the BI field 503-5 may be defined as different values within a total of 14 bits. The order of the T2 field 503-3, the IND field 503-4, and the BI field 503-5 may be random.

Figure 5D:
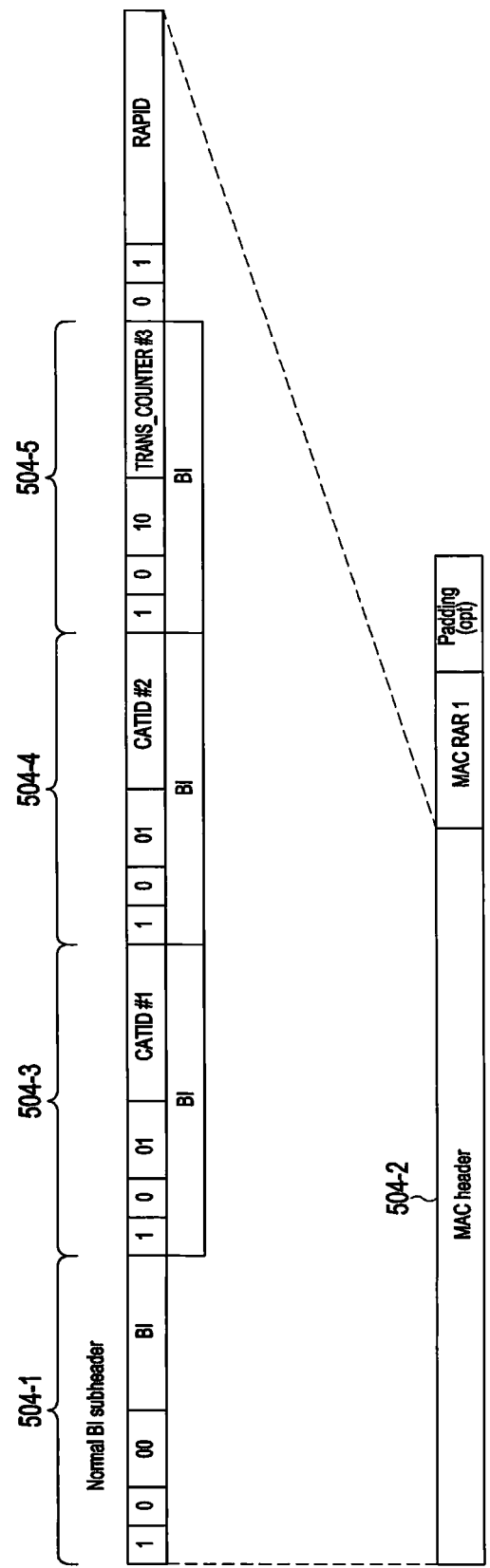
FIG. 5D illustrates a PAR PDU according to an embodiment of the disclosure.

FIG. 5D illustrates a PAR PDU according to one embodiment of the disclosure.

Specifically, FIG. 5D illustrates the RAR PDU including a plurality of BI subheaders according to the first embodiment of the disclosure.

According to an embodiment of the disclosure, one or more BI subheaders may be included in one RAR MAC header. For example, a first subheader of the RAR PDU may be a common BI subheader 504-1. That is, when any BI subheader corresponding to a condition or event is not applicable, the common BI subheader 504-1 may be applied.

For example, the common BI subheader 504-1 may be indicated through a T2 field. When the common BI subheader 504-1 exists, the common BI subheader 504-1 is necessarily located at the beginning of the MAC RAR header 504-2. When there are other BI subheaders 504-3, 504-4, and 504-5, the other BI subheaders may be located after the common BI subheader 504-1.

Figure 6:
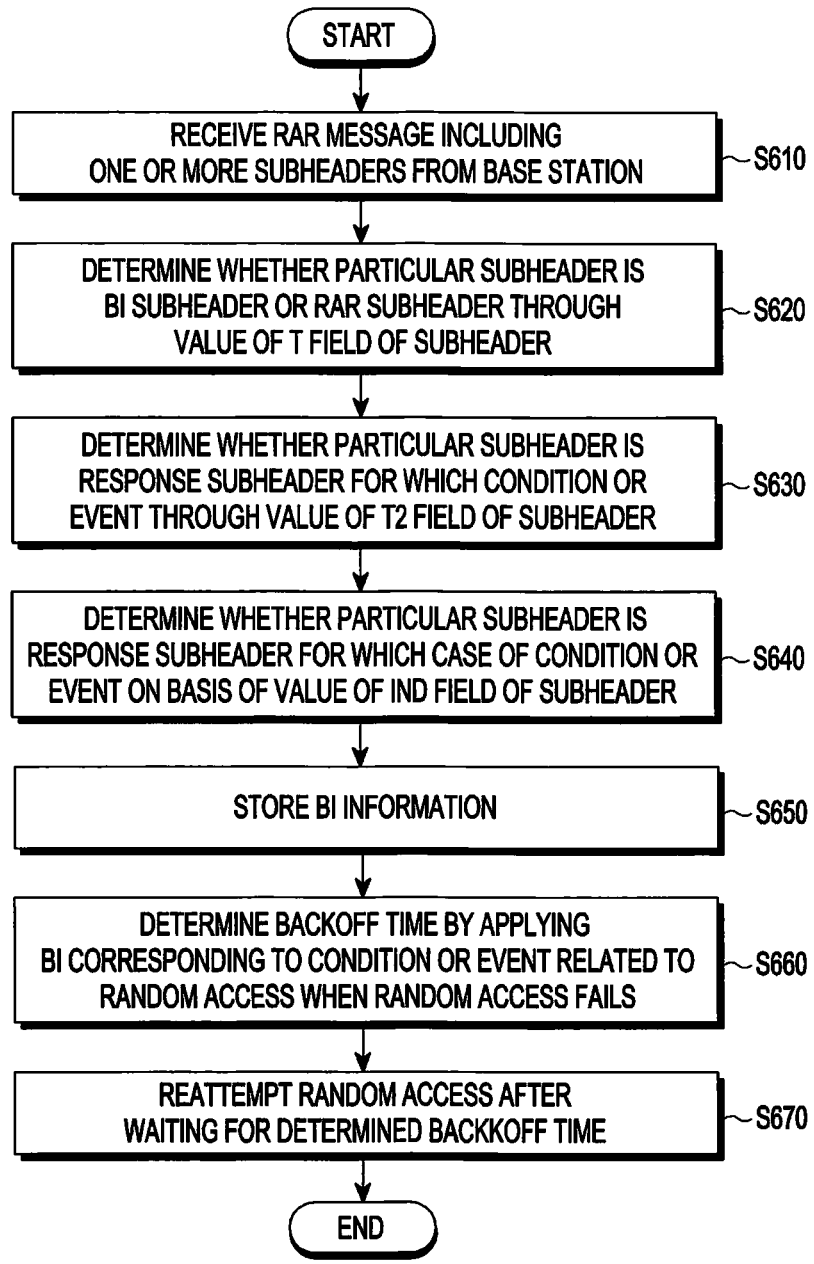
FIG. 6 is a flowchart illustrating the operation of a UE according to an embodiment of the disclosure.

FIG. 6 is a flowchart illustrating the operation of a UE according to an embodiment of the disclosure.

For example, FIG. 6 is the flowchart according to the first embodiment.

Referring to FIG. 6, the UE receives a RAR message including one or more subheaders from a base station (S610). The UE determines whether a particular subheader is a BI subheader or a RAR subheader through the value of a T field of the subheader (S620). The UE determines whether the particular subheader is a response subheader for which condition or event through the value of a T2 field of the subheader (S630). The UE determines whether the particular subheader is a response subheader for which case of the condition or event on the basis of the value of an IND field of the subheader (S640). The UE stores BI information (S650). When random access fails, the UE determines a backoff time by applying a BI corresponding to the condition or event related to the random access (S660). After waiting for the determined backoff time, the UE reattempts random access (S670).

Second Embodiment

Figure 7:
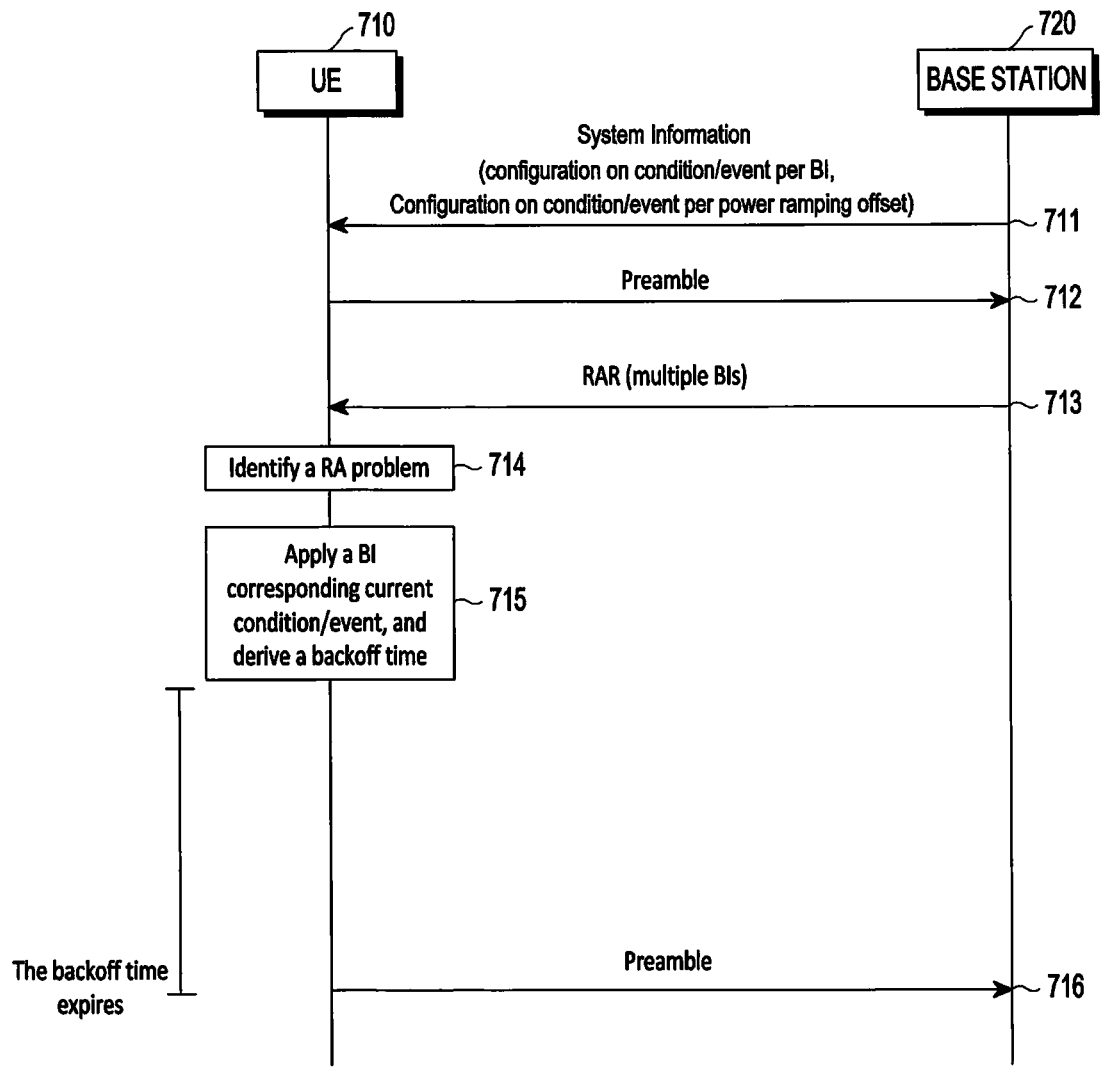
FIG. 7 is a signaling flowchart between a UE and a base station according to an embodiment of the disclosure.

FIG. 7 is a signaling flowchart between a UE and a base station according to an embodiment of the disclosure.

According to the second embodiment of the disclosure, a plurality of BI subheaders may be included in a header of a RAR PDU. Further, in the second embodiment of the disclosure, it is possible to provide which condition or event each BI subheader corresponds to via system information.

For example, the BI subheader may include at least an E field and a BI field, which are applied in LTE. The BI subheader may reuse the one-byte format of LTE without any change. Further, the BI subheader may use two reserved bits in the existing format to indicate particular information.

The second embodiment of the disclosure may minimize a change to the BI subheader format but may include condition or event information in the system information. Accordingly, RRC signaling may be increased.

Here, the system information includes information about one list. Each entry included in the list may correspond to one condition or event. Further, each entry may be mapped one-to-one with one BI subheader included in a RAR MAC header. The order in which entries are included in the list may correspond to the order in which corresponding BI subheaders are included in the RAR MAC header.

Referring to FIG. 7, a UE 710 receives system information from a base station 720 (711). Here, the system information may include configuration information about a condition or an event corresponding to each BI subheader. The order in which pieces of configuration information about respective BI subheaders are included in the particular system information may correspond to the order in which the BI subheaders are included in a header of a RAR PDU.

The UE 710 may transmit a preamble to the base station 720 in a particular condition or event (712). The base station 720 may transmit a RAR message to the UE 710. Here, the RAR message may include one or more BI subheaders (713).

After transmitting the preamble, when failing to receive the RAR message within a specified time period (RAR window) or failing to decode an RAPID corresponding to the preamble in the received RAR message, the UE 720 determines that a random access problem has occurred (714). The UE 710 determines whether there is a BI subheader corresponding to the current condition and event among the BI subheaders included in the received RAR message. Alternatively, the UE 720 determines whether there is a BI subheader corresponding to the current condition and event among previously stored BI subheaders. If the corresponding BI subheader is present, the UE 720 may derive a backoff time by applying a BI value included in the BI subheader (715). If there is no corresponding particular BI subheader, the UE 720 may apply a common BI subheader. When the backoff time expires, the UE 720 may reattempt random access (716).

Figure 8:
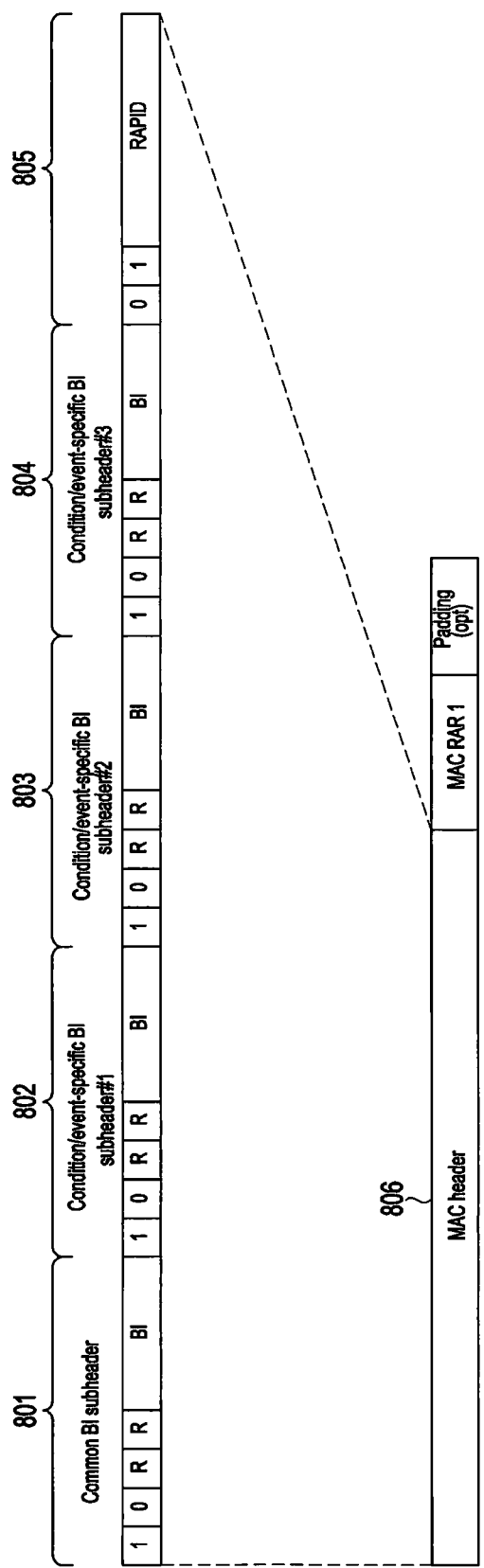
FIG. 8 illustrates a RAR PDU according to an embodiment of the disclosure.

FIG. 8 illustrates a RAR PDU according to an embodiment of the disclosure.

Specifically, FIG. 8 illustrates the RAR PDU including a plurality of BI subheaders according to the second embodiment of the disclosure.

According to the second embodiment of the disclosure, a header 801 of the RAR PDU may include a plurality of BI subheaders 801, 802, 803, 804, and 805. When there is a common BI subheader 801, the common BI subheader 801 may be disposed in the first position of the RAR PDU. Here, if any BI subheader corresponding to a condition or event related to a transmitted preamble is not applied, the UE 710 may apply the BI value of the common BI subheader 801.

Configuration information about whether there is the common BI subheader 801 and which condition or event the plurality of BI subheaders corresponds to may be provided via system information. Accordingly, both the common BI subheader 801 and the BI subheader 801 corresponding to a particular condition or event may have the same format. For example, the order in which pieces of configuration information about respective BI subheaders are included in the system information may correspond to the order in which the BI subheaders are included in the header of the RAR PDU.

Figure 9:
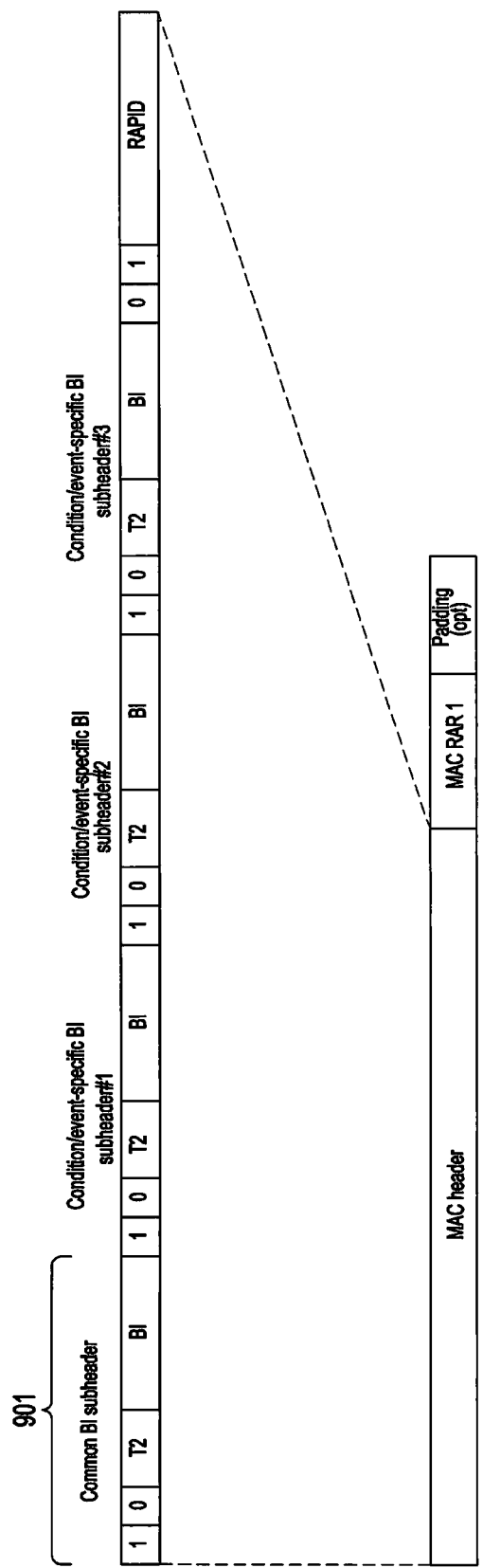
FIG. 9 illustrates a RAR PDU according to another embodiment of the disclosure.

FIG. 9 illustrates a RAR PDU according to another embodiment of the disclosure.

Specifically, FIG. 9 is a second view illustrating the RAR PDU including a plurality of BI subheaders according to the second embodiment of the disclosure.

Referring to FIG. 9, particular information for distinguishing a condition or an event together with condition or event information through system information may be included in a BI subheader. For example, the BI subheader according to the embodiment of the disclosure may maintain the one-byte BI subheader format of LTE, in which existing two reserved bits (T2 field of FIG. 9) may be used to indicate the particular information.

Here, the particular information is information for distinguishing a condition or an event together with information provided via the system information in the second embodiment. For example, the particular information may be used to indicate whether a particular BI subheader is a common BI subheader or a BI subheader belonging to a particular condition or event category. In another example, the system information may provide the UE 710 with information of mapping a particular condition or event to one index value. In addition, the system information may include an index value in a particular field of a BI subheader. Accordingly, it is possible to indicate that the BI subheader corresponds to a particular condition or event, which is effective in reducing the amount of information included in the system information. When there is a common BI subheader 901, the BI subheader 901 may be disposed in the first position of the RAR PDU. The order in which pieces of configuration information about respective BI subheaders are included in the system information may correspond to the order in which the BI subheaders are included in a header of the RAR PDU.

Figure 10:
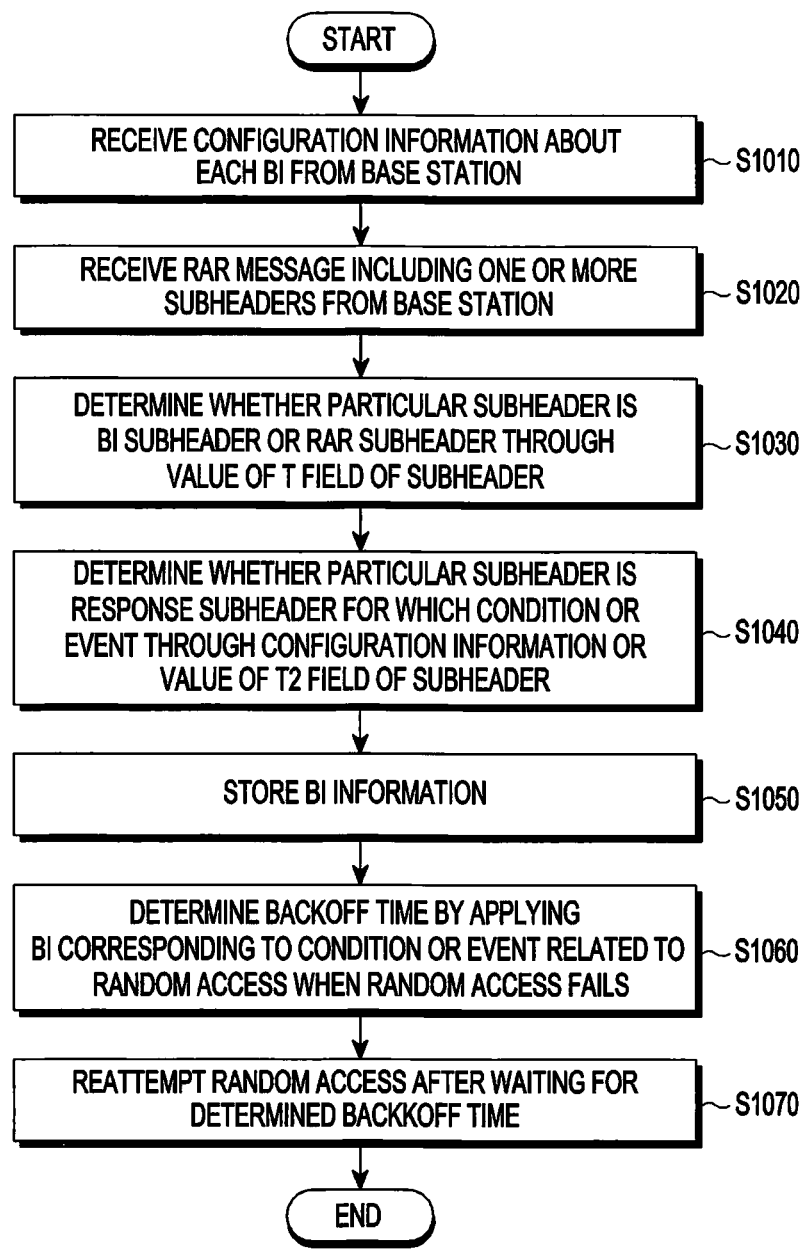
FIG. 10 is a flowchart illustrating the operation of a UE according to another embodiment of the disclosure.

FIG. 10 is a flowchart illustrating the operation of a UE according to another embodiment of the disclosure.

For example, FIG. 10 is the flowchart of the UE according to the second embodiment.

Referring to FIG. 10, the UE 710 receives configuration information about each BI from a base station 720 (S1010). The UE 710 receives a RAR message including one or more subheaders from the base station 720 (S1020). The UE 710 determines whether a particular subheader is a BI subheader or a RAR subheader through the value of a T field of the subheader (S1030). The UE 710 determines whether the particular subheader is a response subheader for which condition or event through the configuration information or the value of a T2 field of the subheader (S1040). The UE 710 stores BI information (S1050). When random access fails, the UE 710 determines a backoff time by applying a BI corresponding to the condition or event related to the random access (S1060). After waiting for the determined backoff time, the UE 710 reattempts random access (S1070).

Third Embodiment

According to an embodiment of the disclosure, a base station may provide only a single BI subheader as in the LTE technology. Random access related to a condition or event provided by the base station via system information may disregard this BI subheader.

In this case, the condition or event may include SRB1 transmission, an SI request, handover, and connection re-establishment. Here, disregarding the BI subheader may mean that a BI value included in the subheader may not be applied.

For example, in random access that is not related to a condition or event, when the random access fails, preamble transmission may be reattempted after waiting for a backoff time by applying the BI value of the BI subheader. Here, the condition or event may be predefined or provided via the system information. Whether to disregard the BI value according to a particular condition or event may be controlled by at least one indicator.

An embodiment of the disclosure may propose applying separate power ramping configuration information applied to the particular condition or event.

For example, the power ramping configuration information may include powerRampingStep, preambleInitialReceivedTargetPower, and preambleTransMax values.

Here, powerRampingStep may refer to a transmission power increased in preamble retransmission (power ramping factor), preambleInitialReceivedTargetPower may refer to an initial preamble transmission power, and preambletransMax may refer to a maximum preamble transmission power.

For example, first power ramping configuration information may be applied to general random access, and second power ramping configuration information may be applied to a particular condition or event. Here, the second power ramping configuration information may include at least one of the foregoing parameters. In addition, the power ramping configuration information may be used for control in conjunction with the backoff.

According to an embodiment of the disclosure, methods for applying a BI value and second power ramping configuration information may be proposed as follows.

Option 1

A particular condition or event may be predefined (hard-coded) or may be provided to a UE through system information. Further, second power ramping configuration information may be provided to the UE via the system information.

For example, when triggered random access matches the particular condition or event, a BI value included in a BI subheader of a random access response message (RAR) may be disregarded. Here, the second power ramping configuration information may be applied to calculate a preamble transmission power.

Option 2

A particular condition or event may be provided to a UE through system information. Further, second power ramping configuration information may be provided to the UE via the system information.

For example, when the particular condition or event is provided, it may be indicated to the UE to disregard a BI value and to apply the second power ramping configuration information.

For example, when information about the particular condition or event is provided via the system information and triggered random access corresponds to the particular condition or event, a BI value included in a BI subheader of a random access response message (RAR) may be disregarded. In addition, the second power ramping configuration information may be applied to calculate a preamble transmission power.

Option 3

A particular condition or event may be predefined (hard-coded) or may be provided to a UE through system information. Further, second power ramping configuration information may be provided to the UE via the system information.

For example, the system information may include a first indicator, and the first indicator may be used to indicate whether to disregard a BI value and to apply the second power ramping configuration information.

In another example, the first indicator may be delivered via a MAC CE instead of the system information. The first indicator may be represented by a one-bit field of a particular subheader including a BI field.

For example, when the first indicator is configured and triggered random access corresponds to the particular condition or event, a BI value included in a BI subheader of a random access response message (RAR) may be disregarded. In addition, the second power ramping configuration information may be applied to calculate a preamble transmission power.

Option 4

A particular condition or event may be predefined (hard-coded) or may be provided to a UE through system information. Further, second power ramping configuration information may be provided to the UE via the system information.

For example, when the second power ramping configuration information is provided, it may be indicated to the UE whether to disregard a BI value and to apply the second power ramping configuration information.

When the second power ramping configuration information is provided and triggered random access corresponds to the particular condition or event, a BI value included in a BI subheader of a random access response message (RAR) may be disregarded. In addition, the second power ramping configuration information may be applied to calculate a preamble transmission power.

Option 5

A particular condition or event may be predefined (hard-coded) or may be provided to a UE through system information. Further, second power ramping configuration information may be provided to the UE via the system information.

For example, the system information may include a first indicator, and the first indicator may indicate disregard of a BI value.

In another example, the first indicator may be delivered via a MAC CE instead of the system information. The first indicator may be represented by a one-bit field of a particular subheader including a BI field.

When the first indicator is configured and triggered random access corresponds to the particular condition or event, a BI value included in a BI subheader of a random access response message (RAR) may be disregarded.

For example, when the second power ramping configuration information is provided, the second power ramping configuration information may be applied to calculate a preamble transmission power.

Option 6

A particular condition or event may be predefined (hard-coded). Further, second power ramping configuration information may be provided to the UE via system information.

When triggered random access corresponds to the particular condition or event, a BI value included in a BI subheader of a random access response message (RAR) may be disregarded.

When the second power ramping configuration information is provided, the second power ramping configuration information may be applied to calculate a preamble transmission power.

Figure 11:
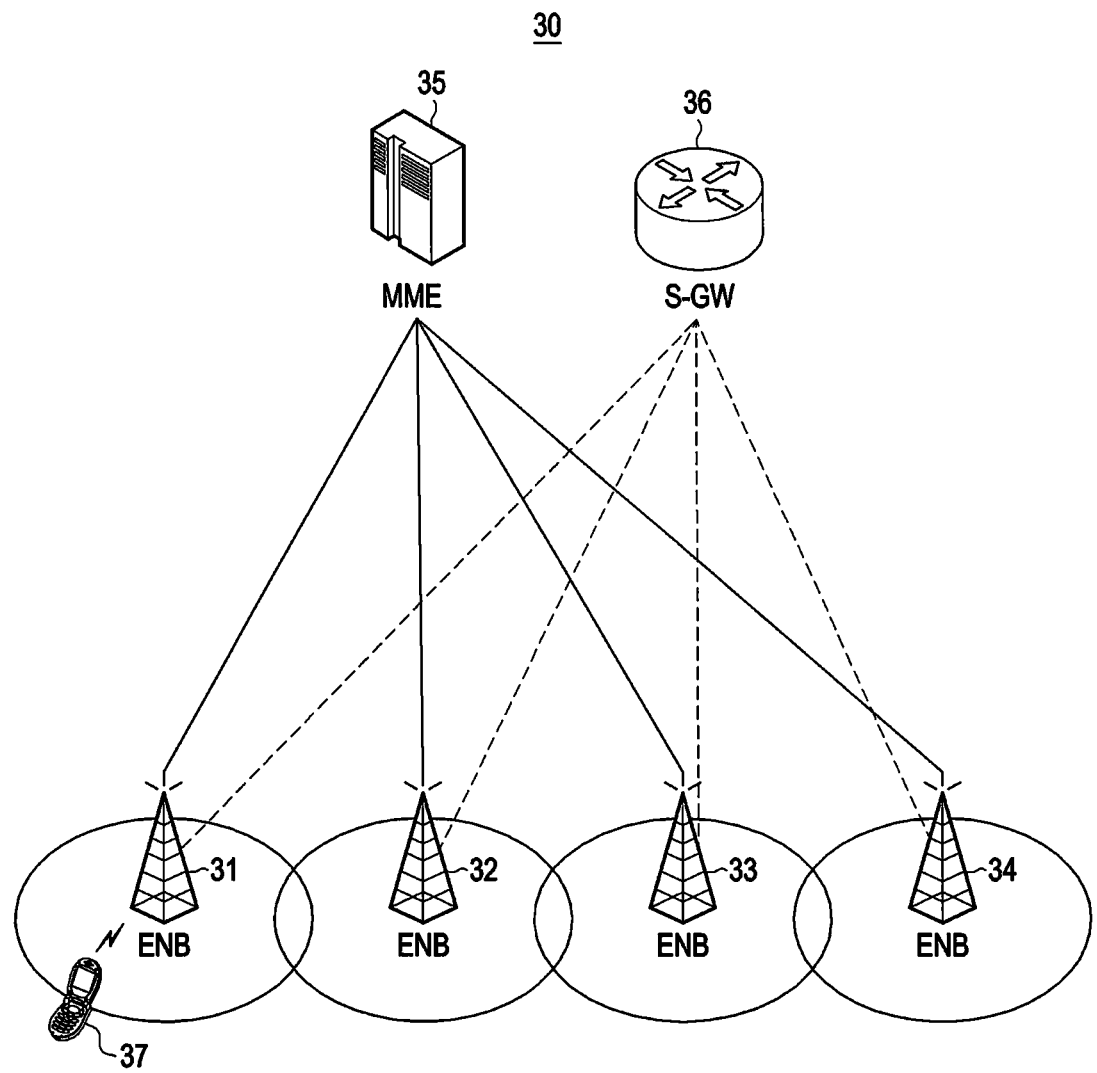
FIG. 11 illustrates an LTE system according to an embodiment of the disclosure.

FIG. 11 illustrates an LTE system according to an embodiment of the disclosure.

Referring to FIG. 11, the LTE system (or wireless communication system) 30 includes a plurality of base stations 31, 32, 33, and 34, a mobility management entity (MME) 35, and a serving-gateway (S-GW) 36. A user equipment (hereinafter, UE or terminal) 37 is connected to an external network via the base stations 31, 32, 33, and 34 and the S-GW 36.

The base stations 31, 32, 33, and 34 are access nodes of cellular networks and provide wireless connectivity for UEs (e.g., including 37) connecting to the networks. That is, the base stations 31, 32, 33, and 34 may collect state information about UEs, such as a buffer status, an available transmission power state, and a channel state, in order to serve traffic of users. The base stations 31, 32, 33, and 34 may support a connection between the UEs and a core network (CN) through scheduling using the collected state information.

The MME 35 is a device that performs a mobility management function for the UE 37 and various control functions and may be connected to the plurality of base stations 31, 32, 33, and 34.

The S-GW 36 is a device that provides a data bearer.

The MME 35 and the S-GW 36 may further perform authentication of a UE accessing a network, bearer management, and the like and may process a packet received from the base stations 31, 32, 33, and 34 or a packet to be delivered to the base stations 31, 32, 33, and 34.

Figure 12:
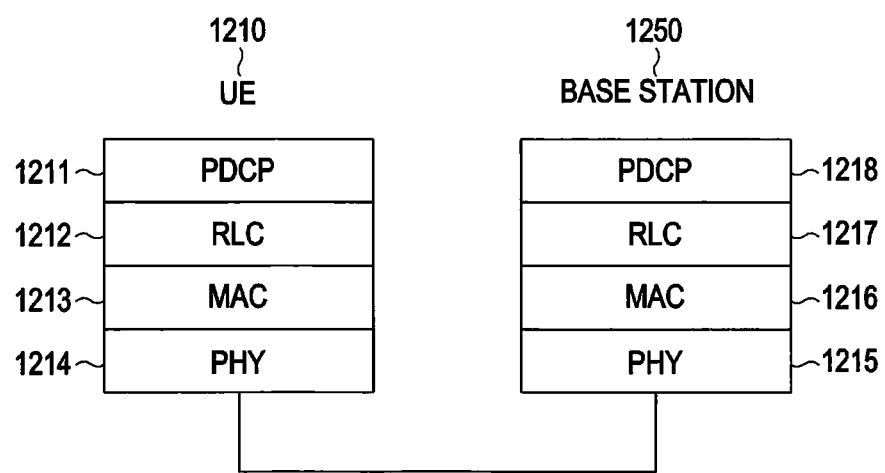
FIG. 12 illustrates the structure of wireless protocols for an LTE system according to an embodiment of the disclosure.

FIG. 12 illustrates the structure of wireless protocols for an LTE system according to an embodiment of the disclosure.

Referring to FIG. 12, the wireless protocols for the LTE system include a packet data convergence protocol (PDCP) 1211 and 1218, a radio link control (RLC) 1212 and 1217, and a medium access control (MAC) 1213 and 1216 for each of a UE 1210 and a base station 1250.

The PDCP 1211 and 1218 is responsible for IP header compression/decompression operations, and the RLC 1212 and 1217 reconfigures a PDCP packet data unit (PDU) into an appropriate size. The MAC 1213 and 1216 is connected to a plurality of RLC layer devices configured in one UE 1210, multiplexes RLC PDUs to an MAC PDU, and demultiplexes RLC PDUs from an MAC PDU.

A physical (PHY) layer 1214 and 1215 performs channel coding and modulation of upper-layer data into OFDM symbols to thereby transmit the OFDM symbols via a radio channel or performs demodulation and channel decoding of OFDM symbols received through a radio channel to thereby transmit the OFDM symbols to an upper layer. The physical layer also uses hybrid ARQ (HARQ) for additional error correction, in which a reception terminal transmits one bit to indicate whether a packet transmitted from a transmission terminal is received. This is referred to as HARQ ACK/NACK information.

Downlink HARQ ACK/NACK information in response to uplink transmission may be transmitted through a physical channel, such as a physical hybrid-ARQ indicator channel (PHICH), and uplink HARQ ACK/NACK information in response to downlink transmission may be transmitted through a physical channel, such as a physical uplink control channel (PUCCH) or physical uplink shared channel (PUSCH).

The physical layer may include one frequency/carrier or a plurality of frequencies/carriers, and a technology for one base station 1250 to simultaneously configure and use a plurality of frequencies is referred to as carrier aggregation (hereinafter, "CA"). In CA, instead of using one carrier, a main carrier and one additional subcarrier or a plurality of additional subcarriers are used for communication between a terminal (or UE) 1210 and a base station (E-UTRAN NodeB: eNB) 1250, thereby dramatically increasing the transmission amount as much as the number of subcarriers. In LTE, a cell of a base station using a main carrier is referred to as a primary cell (PCell), and a cell using a subcarrier is referred to as a secondary cell (SCell).

A technique of extending the CA function to two base stations is referred to dual connectivity (hereinafter, DC). In DC, a UE is simultaneously connected to a master base station (master E-UTRAN NodeB, MeNB, or master NodeB: MN) and a secondary base station (secondary E-UTRAN NodeB, SeNB, or secondary NodeB: SN) to use the same. Cells belonging to the master base station are defined as a master cell group (hereinafter, MCG), and cells belonging to the secondary base station are defined as a secondary cell group (hereinafter, SCG). Each cell group has a representative cell, a representative cell of the master cell group is referred to as a primary cell (hereinafter, PCell), and a representative cell of the secondary cell group is referred to as a primary secondary cell (hereinafter, PSCell). When NR described above is used, a UE may simultaneously use LTE and NR by employing LTE for the MCG and employing NR for the SCG.

Although not shown in the drawing, a radio resource control (hereinafter, RRC) layer exists above the PDCP layer of each of the UE 1210 and the base station 1250. The RRC layer may transmit and receive connection and setup control messages for radio resource control. For example, it is possible to indicate a configuration of measuring a neighboring cell to the UE 1210 using an RRC-layer message, and the UE 1210 may report a measurement result to the base station 1250 using the RRC-layer message.

Figure 13:
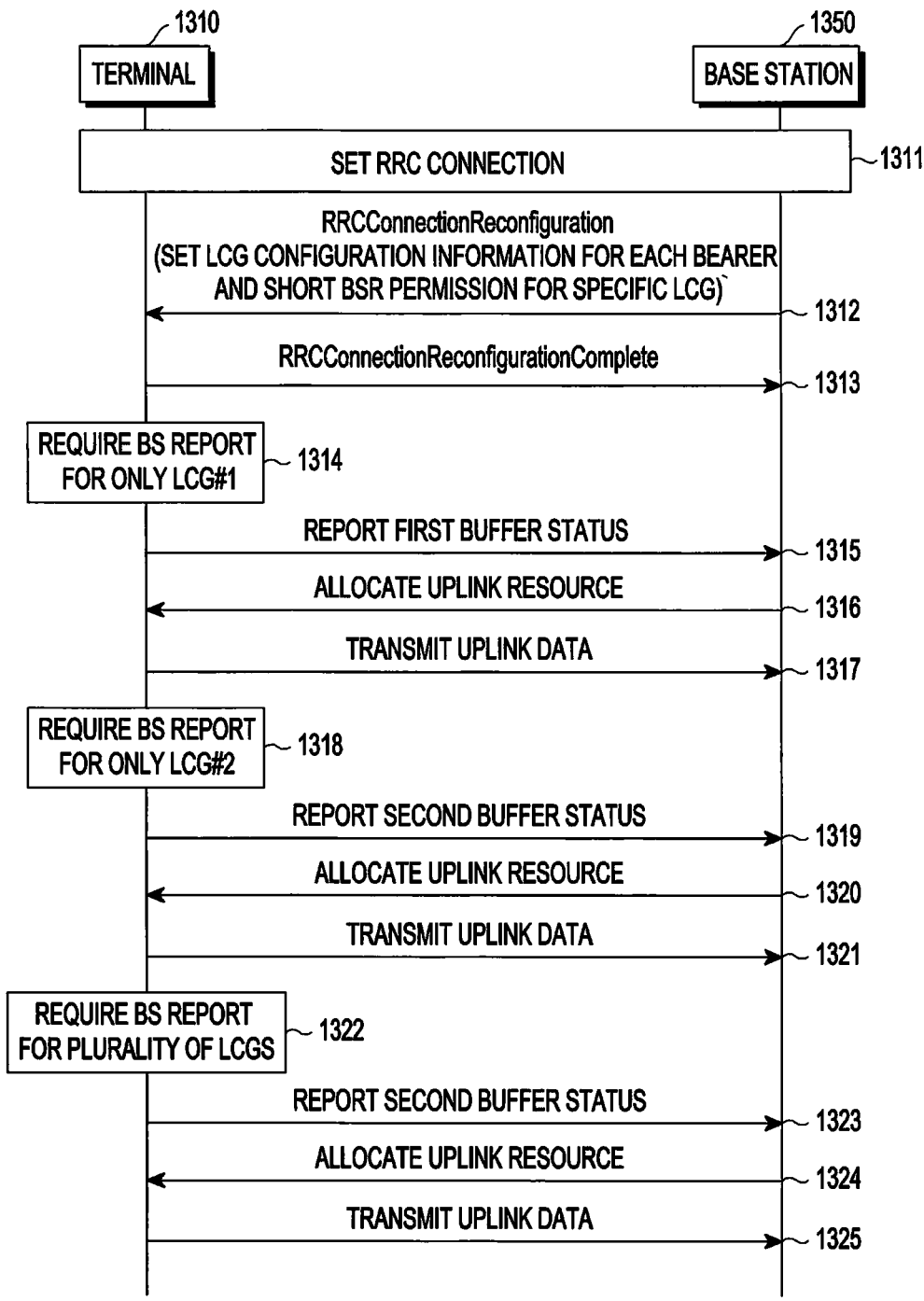
FIG. 13 illustrates the flow of messages between a UE and a base station according to an embodiment of the disclosure.

FIG. 13 illustrates the flow of messages between a UE and a base station according to an embodiment of the disclosure.

Specifically, FIG. 13 illustrates the flow of messages between a UE 1310 and a base station 1320 where data buffer status report method 1 for uplink data transmission is used according to an embodiment of the disclosure.

Referring to FIG. 13, the UE 1310 in an idle mode RRC_IDLE performs connection to the base station 1350 when there is data to be transmitted or a paging message indicating that there is data to be received is received from a network. (1312).

The idle mode is a state in which the UE is not connected to the network for power saving and thus cannot transmit data. In the idle mode, the UE needs to transition to a connected mode (RRC_CONNECTED) for data transmission. When the UE 1310 is connected to the base station 1350, the UE 1310 is changed to the connected mode (RRC_CONNECTED).

The base station 1350 establishes a logical (or virtual) channel for transmitting data so that the UE 1310 can transmit data. The logical (or virtual) channel for transmitting data is referred to as a data radio bearer (DRB).

Meanwhile, a logical (or virtual) channel for transmitting a control signal is referred to as a signaling radio bearer (SRB).

Each of a DRB and an SRB has a logical channel identity (LCID). Further, when signaling or data is transmitted via a downlink or uplink, the DRB and the SRB include a logical channel identifier corresponding to the type of the data in a header in an MAC layer. Accordingly, a reception terminal can distinguish whether a corresponding packet is signaling or data. In addition, when the packet is a data packet, the reception terminal may determine which DRB the data packet belongs to, thereby distinguishing the received data.

The base station 1350 may transmit an RRCConnectionReconfiguration message to the UE in order to configure a DRB, thereby configuring a new DRB for the UE 1310. Here, DRB configuration information includes configuration information related to PDCP, RLC, and MAC layers described above (1312). For example, when a plurality of DRBs is configured, separate configuration information about each DRB may be included. In addition, as MAC layer-related information, logical channel group (LCG) information may be configured for each DRB.

For example, when the base station 1350 configures a total of five DRBs for the UE 1310, the respective DRBs may be allocated LCIDs of 3, 4, 5, 6, and 7. In this case, the base station 1350 may allocate LCIDs of 3 and 4 to LCG 1, LCIDs of 5 and 6 to LCG 2, and an LCID of 7 to LCG 3.

For example, an LCG may be used when the UE 1310 requests a resource from the base station 1350, which will be described later. For example, when the UE 1310 has 100-byte data to be transmitted via an LCID of 3, 100-byte data to be transmitted via an LCID of 4, and 100-byte data to be transmitted via the LCID of 7, the UE 1310 may report to the base station 1350 that the UE 1310 has 200-byte data and 100-byte data to be transmitted via LCG 1 and LCG 3, respectively, instead of separately reporting the amount of data to be transmitted via each LCID.

Regarding a logical channel group, the base station 1350 may configure a logical channel group for transmitting a short BSR, which will be described below, for the UE 1310. For example, it is assumed that LCG 1 is configured to transmit a short BSR.

Upon receiving the configuration information, the UE 1310 transmits an acknowledgement message indicating successful reception of the configuration to the base station 1350. To this end, an RRCConnectionReconfigurationComplete message of the layer may be used (1313).

When the amount of data to be transmitted via each DRB in a buffer in the UE 1310 satisfies a predetermined condition, the UE 1310 may report this information to the base station 1350. This is called a buffer status report (BSR). Transmitted buffer status reports may be divided as follows according to the triggering condition.

Type 1: Regular BSR

BSR transmitted when a BSR retransmission timer (retxBSR-Timer) expires where the UE has data to be transmitted via an SRB/DRB belonging to an LCG BSR transmitted when there is data to be transmitted from an upper layer (RLC or PDCP layer) via the SRB/DRB belonging to the LCG and this data has a higher priority than a logical channel/radio bearer belonging to any LCG BSR transmitted when there is data to be transmitted from an upper layer (RLC or PDCP layer) via a logical channel/radio bearer belonging to the LCG and there is no data in any LCG except for this data Type 2: Periodic BSR BSR transmitted when a periodic BSR timer (periodicBSR-Timer) configured for the UE expires Type 3: Padding BSR BSR transmitted when an uplink resource is allocated and padding bits filling the remaining space after data transmission are equal to or greater than the size of a BSR MAC CE plus the size of a subheader of the BSR MAC CE When there are packets in buffers of a plurality of LCGs, a truncated BSR is transmitted.

Accordingly, when an uplink resource is allocated by the base station 1350 and padding (i.e., remaining space) occurs, a long BSR or a short BSR/truncated BSR may be transmitted according to the size of the remaining space. A long BSR format and a short BSR format will be described in detail with reference to FIG. 14.

For example, when a regular BSR or a periodic BSR is triggered to be transmitted, if a packet exists only in a buffer of an LCG (e.g., LCG 1) that is allowed to transmit a short BSR among configured LCGs for the UE 1310 (1314), the UE 1310 generates and transmits a BSR in the short BSR format to the base station 1350 (1315). Upon receiving the BSR, the base station 1350 recognizes that there is data to be transmitted via LCG 1 of the UE and allocates an uplink resource for transmitting the data (1316). The UE 1310 receives uplink resource allocation information and transmits the data in the buffer via the resource (1317).

Further, when a regular BSR or a periodic BSR is triggered to be transmitted, if a packet exists only in a buffer of an LCG (e.g., LCG 2) other than an LCG (e.g., LCG 1) that is allowed to transmit a short BSR among configured LCGs for the UE (1318), the UE 1310 generates and transmits a BSR in the long BSR format to the base station 1350 (1319) even though there is data to be transmitted via only one LCG. Upon receiving the BSR, the base station 1350 recognizes that there is data to be transmitted via LCG 2 of the UE 1310 and allocates an uplink resource for transmitting the data (1320). The UE 1310 receives uplink resource allocation information and transmits the data in the buffer via the resource (1321).

In addition, when a regular BSR or a periodic BSR is triggered to be transmitted, if packets exist in buffers of a plurality of LCGs among configured LCGs for the UE 1310 (1322), the UE 1310 generates and transmits a BSR in the long BSR format to the base station 1350 (1323). Upon receiving the BSR, the base station 1350 recognizes that there is data to be transmitted via each LCG of the UE and allocates an uplink resource for transmitting the data (1324). The UE 1310 receives uplink resource allocation information and transmits the data in the buffer via the resource (1325).

Figure 14A:
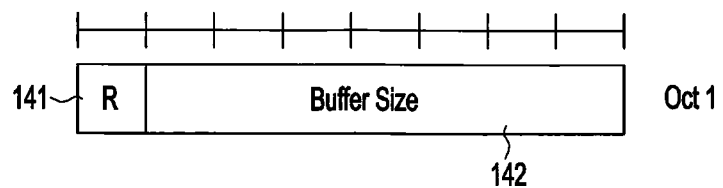
FIG. 14A to FIG. 14C illustrate a BSR format according to an embodiment of the disclosure.
Figure 14B:
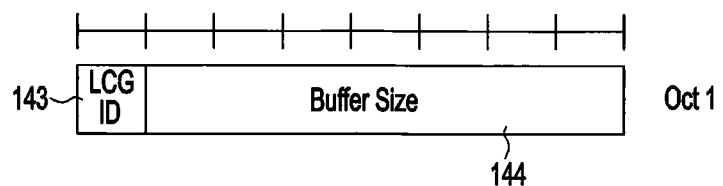
Figure 14C:
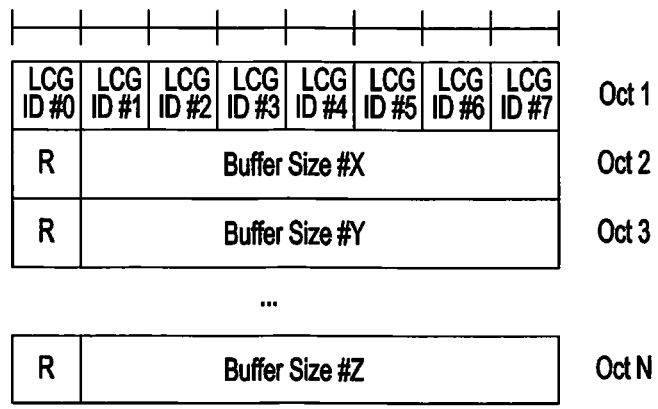

FIG. 14A to FIG. 14C illustrate a BSR format according to an embodiment of the disclosure.

FIG. 14A to FIG. 14C illustrates a BSR format for buffer status report method 1 according to an embodiment of the disclosure.

FIG. 14A and FIG. 14B illustrate the aforementioned short BSR format according to an embodiment of the disclosure, and FIG. 14C illustrates the long BSR format according to an embodiment of the disclosure.

In FIG. 14A to FIG. 14C, a buffer size (BS) field having the same size (e.g., seven bits) is used for the short BSR format and the long BSR format.

Accordingly, as described above with reference to FIG. 13, when the short BSR format is configured to be used for a particular LCG through an RRC message, if there is data only in the LCG, the short BSR format may be used to transmit the data.

FIG. 14A illustrates a size of one byte including a BS of seven bits and a reserved bit (R bit) 141.

FIG. 14B illustrates a case where the BS is seven bits likewise. FIG. 14B includes information for indicating which LCG ID the remaining one bit refers to. For example, it is assumed in NR that there are up to eight LCG identifiers and a base station can use two LCGs for the short BSR format. Accordingly, when the base station 1350 configures the short BSR to be used for two LCGs, it is possible to report a buffer status of an LCG to the base station 1350 by setting an LCGID 143 bit to 0 when reporting BS information of a lower LCG identifier of two LCG identifiers and by setting the LCGID 143 bit to 1 when reporting BS information of a higher LCG identifier of the two LCG identifiers.

FIG. 14C illustrates the long BSR format capable of variably reporting the amount of data in a buffer for each LCG identifier.

Referring to FIG. 14C, eight bits of a first byte may each indicate an LCG (i.e., a bitmap). For example, each bit may indicate the presence of a BS field of each of LCGs 0 to 7. For example, when the bit is set to 1 according to bit information of the bitmap, buffer size information corresponding to the LCG or LCID is included.

For example, when data exists in buffers of LCG ID #1, #5, and #6, the bitmap includes 01000110, and a buffer size corresponding to 1 in the bitmap is included. FIG. 14C illustrates a length of one byte for each buffer size. In this case, one byte of the bitmap and the number of 1s of the bitmap multiplied by each buffer size, 1*3=3 bytes, are added, thereby generating a buffer status report of four bytes in total. In this case, when the BS is seven bits, it is possible to report a buffer status in detailed units of $2^7=128$ stages, and alignment in bytes may be achieved as illustrated in FIG. 14C.

The short BSR format may also be used for transmitting a truncated BSR, which is transmitted when a padding BSR is triggered. For example, when the UE 1310 has data for a plurality of LCGs in a buffer, if the size of padding bits is too small to carry a long BSR for reporting all BSs for the plurality of LCG, a truncated BSR in the short BSR format is transmitted. The short BSR and the truncated BSR may be distinguished through different LCIDs in a subheader of an MAC layer transmitted along with the BSR. Accordingly, although there is no data to be transmitted in the LCG for which the short BSR is set, the truncated BSR having the short BSR format may be transmitted, and the BS may be 0.

Figure 15:
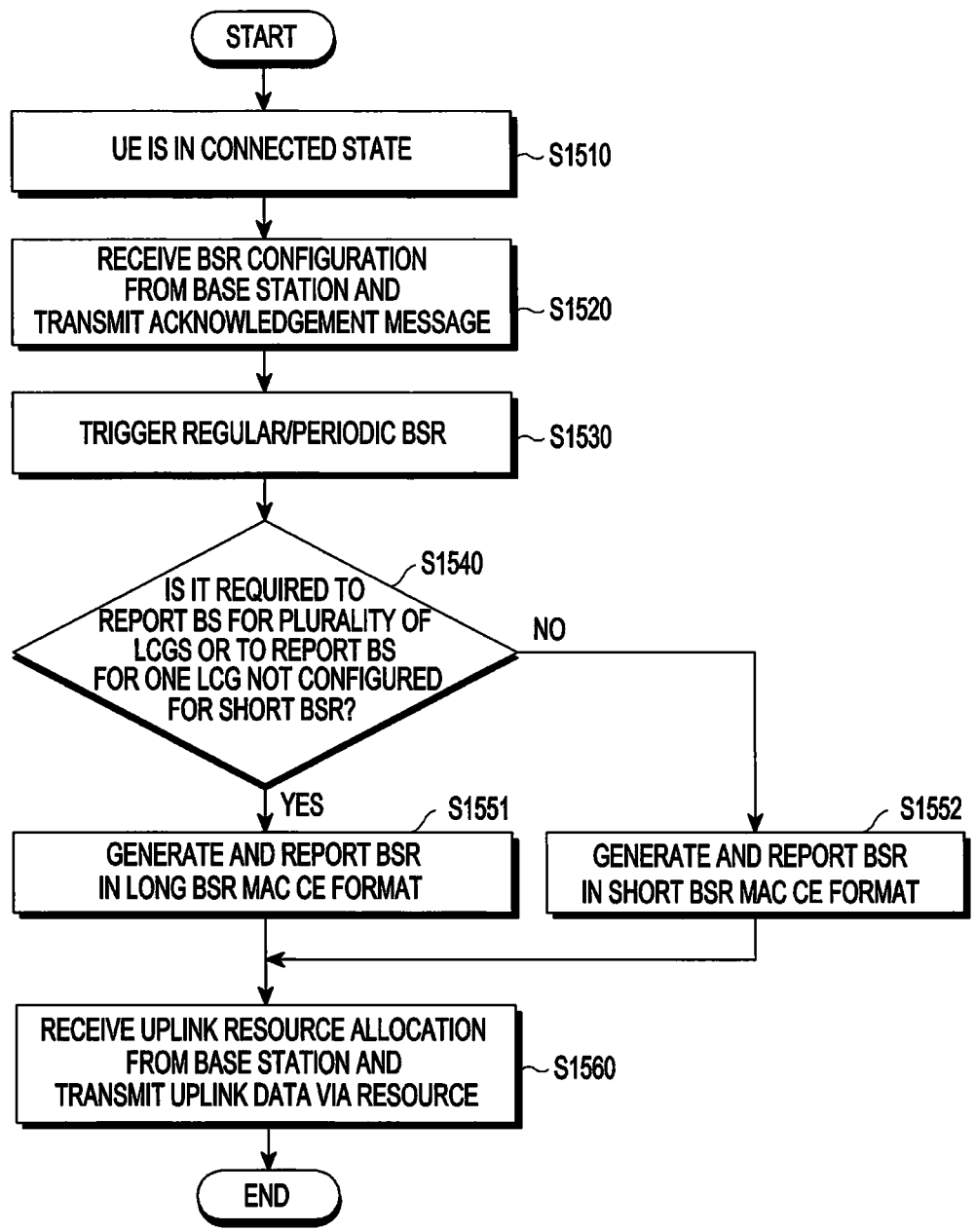
FIG. 15 is a flowchart illustrating the operation of a UE according to an embodiment of the disclosure.

FIG. 15 is a flowchart illustrating the operation of a UE according to an embodiment of the disclosure.

Specifically, FIG. 15 is the flowchart illustrating the operation of the UE when data buffer status report method 1 is used.

In FIG. 15, it is assumed that the UE 1310 is in a connected state (RRC_CONNECTED) after completing a procedure for connection to a base station 1330 (S1510). The UE 1310 receives an RRCConnectionReconfiguration message from the base station 1330 and transmits an RRCConnectionReconfigurationComplete message as an acknowledgement message in response thereto (S1520). The UE 1310 receives a DRB from the RRCConnectionReconfiguration message. The DRB configuration information may include configuration information related to PDCP, RLC, and MAC layers as described above. For example, when a plurality of DRBs is configured, separate configuration information about each DRB is included. In addition, as MAC layer-related information, information about an LCG to which each DRB belongs may be configured. Further, it may be configured that short BSR transmission is allowed for a particular LCG through an RRC-layer message.

When the amount of data to be transmitted via each DRB in a buffer in the UE satisfies a predetermined condition, the UE 1310 reports this information to the base station 1330. This is called a BSR. Transmitted buffer status reports may be divided as follows according to the triggering condition.

Type 1: Regular BSR

BSR transmitted when a BSR retransmission timer (retxBSR-Timer) expires where the UE 1310 has data to be transmitted via an SRB/DRB belonging to an LCG BSR transmitted when there is data to be transmitted from an upper layer (RLC or PDCP layer) via the SRB/DRB belonging to the LCG and this data has a higher priority than a logical channel/radio bearer belonging to any LCG BSR transmitted when there is data to be transmitted from an upper layer (RLC or PDCP layer) via a logical channel/radio bearer belonging to the LCG and there is no data in any LCG except for this data Type 2: Periodic BSR BSR transmitted when a periodic BSR timer (periodicBSR-Timer) configured for the UE 1310 expires Type 3: Padding BSR BSR transmitted when an uplink resource is allocated and padding bits filling the remaining space after data transmission are equal to or greater than the size of a BSR MAC CE plus the size of a subheader of the BSR MAC CE When there are packets in buffers of a plurality of LCGs, a truncated BSR is transmitted.

Accordingly, when an uplink resource is allocated by the base station 1330 and padding (i.e., remaining space) occurs, the UE 1310 may transmit a long BSR or a short BSR/truncated BSR according to the size of the remaining space.

When a regular BSR or a periodic BSR is triggered to be transmitted (S1530), if data exists in buffers of a plurality of LCGs among configured LCGs for the UE 1310 or if a packet exists only in a buffer of one LCG not allowed to transmit a short BSR (Yes in S1540), the UE 1310 generates and transmits a BSR in the long BSR format to the base station 1330 (S1551). When the UE 1310 has no data to be reported or a packet exists only in a buffer of one LCG allowed to transmit a short BSR (No in S1540), the UE 1310 generates and transmits a BSR in the short BSR format to the base station 1330 (S1552). Accordingly, the UE 1310 is allocated an uplink resource from the base station 1330 and transmits uplink data via the resource (S1560).

Figure 16:
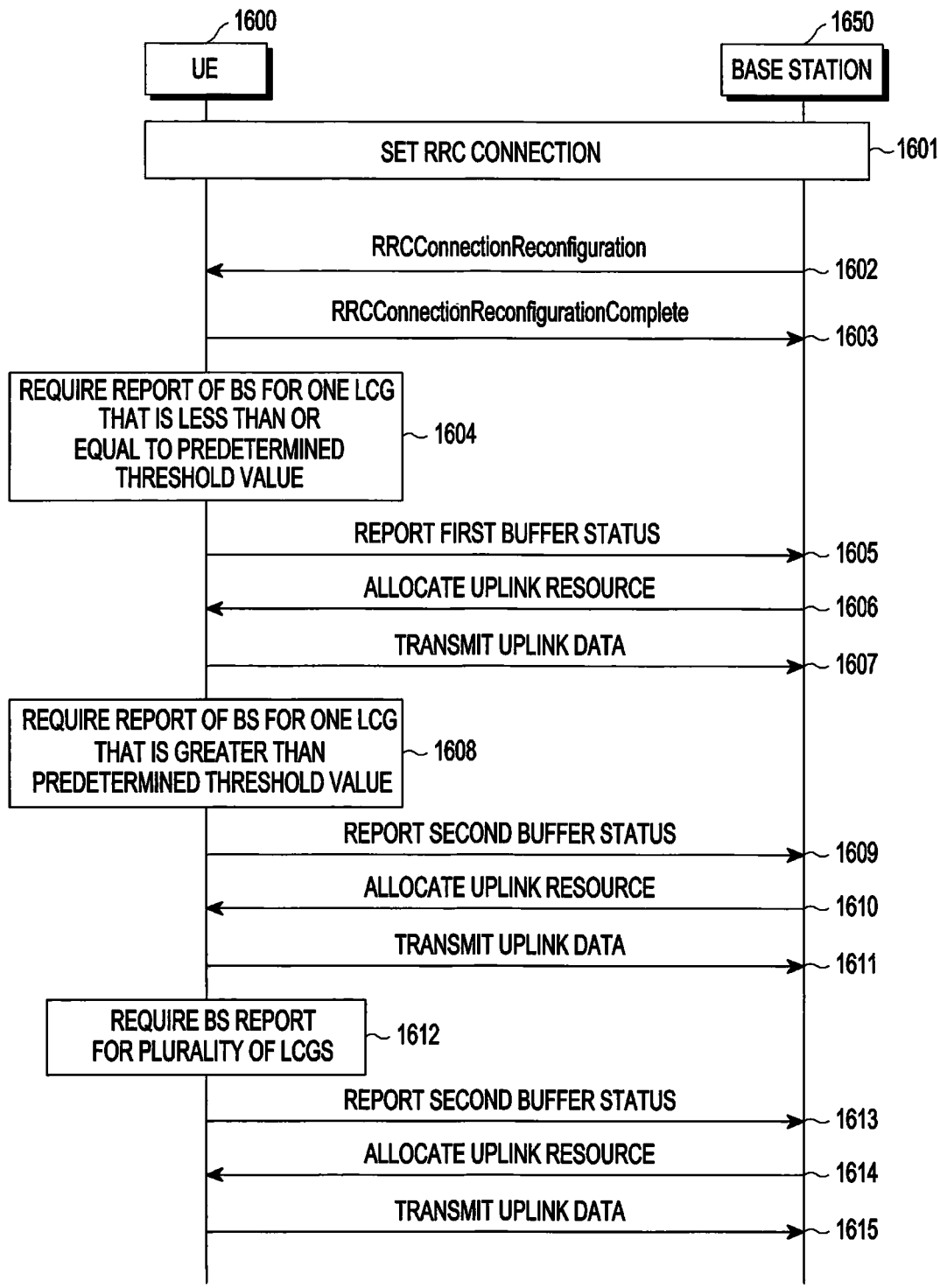
FIG. 16 illustrates the flow of messages between a UE and a base station according to another embodiment of the disclosure.

FIG. 16 illustrates the flow of messages between a UE and a base station according to another embodiment of the disclosure.

Specifically, FIG. 16 illustrates the flow of messages between a UE 1600 and a base station 1650 where data buffer status report method 2 for uplink data transmission is used according to an embodiment of the disclosure.

Referring to FIG. 16, the UE 1600 in an idle (inactive) mode RRC_IDLE performs connection to the base station 1650 when there is data to be transmitted or a paging message indicating that there is data to be received is received from a network. (1601).

The idle mode is a state in which the UE 1600 is not connected to the network for power saving and thus cannot transmit data, and the UE needs to transition to a connected mode (RRC_CONNECTED) for data transmission. When the UE 1600 is successfully connected to the base station 1650, the UE 1600 is changed to the connected mode (RRC_CONNECTED).

The base station 1650 may transmit an RRCConnectionReconfiguration message to the UE 1600 in order to configure a DRB for the UE 1600 to transmit data, thereby configuring a new DRB for the UE 1310. In this case, configuration information includes configuration information related to PDCP, RLC, and MAC layers described above (1602).

When a plurality of DRBs is configured, separate configuration information about each DRB may be included. In addition, as MAC layer-related information, logical channel group (LCG) information may be configured for each DRB. For example, when the base station 1650 configures a total of five DRBs for the UE 1600, the respective DRBs may be allocated LCIDs of LCG 3, LCG 4, LCG 5, LCG 6, and LCG 7. In this case, the base station 1350 may allocate LCIDs of 3 and 4 to LCG 1, LCIDs of 5 and 6 to LCG 2, and an LCID of 7 to LCG 3.

An LCG may be used when the UE 1600 requests a resource from the base station 1650, which will be described later. For example, when the UE 1600 has 100-byte data to be transmitted via an LCID of 3, 100-byte data to be transmitted via an LCID of 4, and 100-byte data to be transmitted via the LCID of 7, the UE 1600 may report to the base station 1650 that the UE 1600 has 200-byte data and 100-byte data to be transmitted via LCG 1 and LCG 3, respectively, instead of separately reporting the amount of data to be transmitted via each LCID.

Upon receiving the configuration information, the UE 1600 transmits an acknowledgement message indicating successful reception of the configuration to the base station 1650. The acknowledgement message may be transmitted using an RRCConnectionReconfigurationComplete message of the RRC layer (1603).

When the amount of data to be transmitted via each DRB in a buffer in the UE satisfies a predetermined condition, the UE 1600 may report this information to the base station 1650. This is called a buffer status report (BSR). Transmitted buffer status reports may be divided as follows according to the triggering condition.

Type 1: Regular BSR

BSR transmitted when a BSR retransmission timer (retxBSR-Timer) expires where the UE 1600 has data to be transmitted via an SRB/DRB belonging to an LCG BSR transmitted when there is data to be transmitted from an upper layer (RLC or PDCP layer) via the SRB/DRB belonging to the LCG and this data has a higher priority than a logical channel/radio bearer belonging to any LCG BSR transmitted when there is data to be transmitted from an upper layer (RLC or PDCP layer) via a logical channel/radio bearer belonging to the LCG and there is no data in any LCG except for this data Type 2: Periodic BSR BSR transmitted when a periodic BSR timer (periodicBSR-Timer) configured for the UE 1600 expires Type 3: Padding BSR BSR transmitted when an uplink resource is allocated and padding bits filling the remaining space after data transmission are equal to or greater than the size of a BSR MAC CE plus the size of a subheader of the BSR MAC CE When there are packets in buffers of a plurality of LCGs, a truncated BSR is transmitted.

Accordingly, when an uplink resource is allocated by the base station 1650 and padding (i.e., remaining space) occurs, a long BSR/(long) truncated BSR or a short BSR/(short) truncated BSR may be transmitted according to the size of the padding (remaining space). A long BSR format and a short BSR format will be described in detail with reference to FIG. 17A and FIG. 17B.

When a regular BSR or a periodic BSR is triggered to be transmitted, if there is no data to be transmitted in the buffer or if data exists only in one LCG and the amount of the data is less than or equal to a predetermined threshold value (1604), the UE 1600 generates and transmits a BSR in the short BSR format to the base station 1650 (1605). Upon receiving the BSR, the base station 1650 recognizes the amount of the data to be transmitted via the LCG of the UE 1600 and allocates an uplink resource for transmitting the data (1606). The UE 1600 receives uplink resource allocation information and transmits the data in the buffer via the resource (1607).

When a regular BSR or a periodic BSR is triggered to be transmitted, if there is data only in one LCG and the amount of the data is greater than the predetermined threshold value (1608), the UE 1600 generates and transmits a BSR in the long BSR format to the base station 1650 (1609) even though there is data only in one LCG. Upon receiving the BSR, the base station 1650 recognizes the amount of the data to be transmitted via the LCG of the UE 1600 and allocates an uplink resource for transmitting the data (1610). The UE 1600 receives uplink resource allocation information and transmits the data in the buffer via the resource (1611).

When a regular BSR or a periodic BSR is triggered to be transmitted, if packets exist in buffers of a plurality of LCGs among configured LCGs for the UE 1600 (1612), the UE 1600 generates and transmits a BSR in the long BSR format to the base station 1650 (1613). Upon receiving the BSR, the base station 1650 recognizes that there is data to be transmitted via each LCG of the UE 1600 and allocates an uplink resource for transmitting the data (1614). The UE 1600 receives uplink resource allocation information and transmits the data in the buffer via the resource (1615).

Figure 17A:
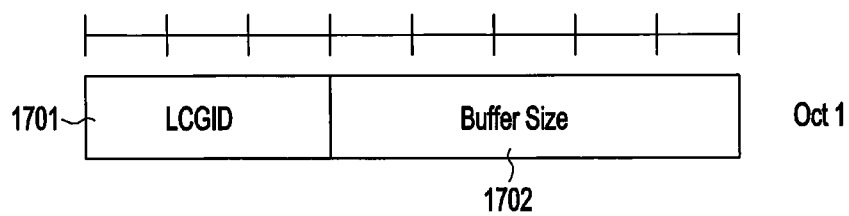
FIG. 17A and FIG. 17B illustrate a BSR format according to another embodiment of the disclosure.
Figure 17B:
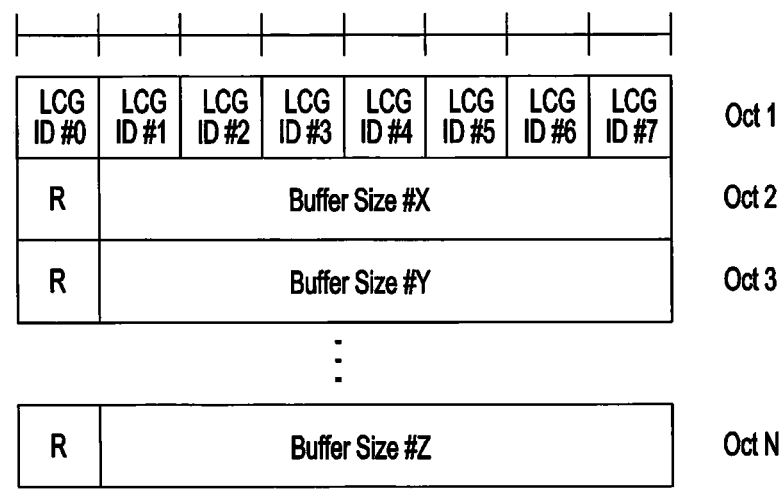

FIG. 17A and FIG. 17B illustrate a BSR format according to another embodiment of the disclosure.

Specifically, FIG. 17A and FIG. 17B illustrate a BSR format for buffer status report method 2.

FIG. 17A illustrates the aforementioned short BSR format, and FIG. 17B illustrates the long BSR format. Referring to FIG. 17A and FIG. 17B, the short BSR format and the long BSR format use different sizes of BS fields (referring to FIG. 17A and FIG. 17B, a BS field of a short BSR is five bits, and a BS field of a long BSR is seven bits).

Accordingly, as described above with reference to FIG. 16, when there is no BS value to be reported or there is a BS value of a predetermined threshold (threshold value) to be reported only in one LCG, the short BSR format may be used for transmission.

FIG. 17A illustrates an example having a size of one byte including an LCGID field 1701 indicating BS information of an LCG and a BS field 1702 transmitting the BS of the LCG. In this example, the BS field has a size of five bits and may thus indicate information of only 32 stages.

Compared to the case where there are only 128 stages when a long BSR transmits data in a BS field of seven bits, the amount of information that can be transmitted may be different when 32-stage information is transmitted. Accordingly, one of the following methods may be used as a method for transmitting a five-bit BS.

Method 1: Using only the top 32 among a total of 128 BS values for the 7-bit BS field Method 2: Using only the top 32 odd indexes, even indexes, or indexes of multiples of 4 (=128/32) (or modular 0) among a total of 128 BS values for the 7-bit BS field Method 3: Defining a separate BS value for the 5-bit BS field Method 4: Signaling 0-31, 32-63, 64-95, and 96-127 indexes by dividing a total of 128 BS values for the 7-bit BS field into four LCIDs Method 5: Seven-bit signaling (i.e., two R bits+five-bit BS field) additionally using an extra reserved field in an MAC subheader in transmission of a short BSR Table 2 and Table 3 are examples illustrated to explain method 1 and method 2 described above.

When method 1 is used, a UE uses only index values from 0 to 31. Accordingly, when a short BSR is used, the UE can report only up to 218 bytes, and the predetermined threshold value mentioned in FIG. 16 may be 218 bytes.

In method 2, when the top 32 even indexes are used, the predetermined threshold value mentioned in FIG. 16 is 4720 bytes; when the top 32 odd indexes are used, the predetermined threshold value mentioned in FIG. 16 is 5212 bytes (Table 2 is an example of information included in Msg3.)

TABLE 2

| Index | Buffer Size | Index | Buffer Size |
|---|---|---|---|
| 0 | 10 | 64 | 5757 |
| 1 | 12 | 65 | 6357 |
| 2 | 13 | 66 | 7021 |
| 3 | 14 | 67 | 7754 |

TABLE 2-continued

| Index | Buffer Size | Index | Buffer Size |
|---|---|---|---|
| 4 | 15 | 68 | 8564 |
| 5 | 17 | 69 | 9458 |
| 6 | 19 | 70 | 10445 |
| 7 | 21 | 71 | 11535 |
| 8 | 23 | 72 | 12740 |
| 9 | 25 | 73 | 14070 |
| 10 | 27 | 74 | 15538 |
| 11 | 30 | 75 | 17161 |
| 12 | 33 | 76 | 18952 |
| 13 | 37 | 77 | 20931 |
| 14 | 41 | 78 | 23116 |
| 15 | 45 | 79 | 25529 |
| 16 | 49 | 80 | 28194 |
| 17 | 55 | 81 | 31138 |
| 18 | 60 | 82 | 34389 |
| 19 | 66 | 83 | 37979 |
| 20 | 73 | 84 | 41944 |
| 21 | 81 | 85 | 46323 |
| 22 | 89 | 86 | 51159 |
| 23 | 99 | 87 | 56500 |
| 24 | 109 | 88 | 62398 |
| 25 | 120 | 89 | 68913 |
| 26 | 133 | 90 | 76107 |
| 27 | 147 | 91 | 84053 |
| 28 | 162 | 92 | 92828 |
| 29 | 179 | 93 | 102520 |
| 30 | 197 | 94 | 113223 |
| 31 | 218 | 95 | 125043 |

(Table 2 continues in Table 3)

TABLE 3

| | | | |
|---|---|---|---|
| 32 | 240 | 96 | 138098 |
| 33 | 265 | 97 | 152516 |
| 34 | 293 | 98 | 168438 |
| 35 | 324 | 99 | 186024 |
| 36 | 357 | 100 | 205445 |
| 37 | 395 | 101 | 226893 |
| 38 | 436 | 102 | 250581 |
| 39 | 481 | 103 | 276742 |
| 40 | 531 | 104 | 305634 |
| 41 | 587 | 105 | 337543 |
| 42 | 648 | 106 | 372783 |
| 43 | 716 | 107 | 411702 |
| 44 | 790 | 108 | 454684 |
| 45 | 873 | 109 | 502154 |
| 46 | 964 | 110 | 554579 |
| 47 | 1065 | 111 | 612478 |
| 48 | 1176 | 112 | 676422 |
| 49 | 1298 | 113 | 747041 |
| 50 | 1434 | 114 | 825033 |
| 51 | 1583 | 115 | 911168 |
| 52 | 1749 | 116 | 1006295 |
| 53 | 1931 | 117 | 1111353 |
| 54 | 2133 | 118 | 1227380 |
| 55 | 2355 | 119 | 1355520 |
| 56 | 2601 | 120 | 1497038 |
| 57 | 2873 | 121 | 1653331 |
| 58 | 3173 | 122 | 1825941 |
| 59 | 3504 | 123 | 2016571 |
| 60 | 3870 | 124 | 2227104 |
| 61 | 4274 | 125 | 2459617 |
| 62 | 4720 | 126 | 2716404 |
| 63 | 5212 | 127 | 3000000 |

As in FIG. 14C, FIG. 17B illustrates an example of a long BSR format capable of variably reporting the amount of data in a buffer for each LCG identifier. In this example, eight bits of a first byte may each indicate an LCG (i.e., a bitmap). For example, each bit may indicate the presence of a BS field of each of LCGs 0 to 7.

For example, when the bit is set to 1 according to bit information of the bitmap, buffer size information corresponding to the LCG or LCID is included. For example, when data exists in buffers of LCG ID #1, #5, and #6, the bitmap includes 01000110, and a buffer size corresponding to 1 in the bitmap is included.

Referring to FIG. 17B, when each buffer size has one byte, one byte of the bitmap and the number of 1s of the bitmap multiplied by each buffer size, 1*3=3 bytes, are added, a buffer status report of four bytes in total is generated.

Referring to FIG. 17B, when the BS is seven bits, it is possible to report a buffer status in detailed units of 2^7=128 stages, and alignment in bytes may be achieved as illustrated.

The short BSR format may also be used for transmitting a truncated BSR, which is transmitted when a padding BSR is triggered. For example, when the UE 1600 has data for a plurality of LCGs in a buffer, if the size of padding bits is too small to carry a long BSR for reporting all BSs for the plurality of LCGs, a truncated BSR in the short BSR format (e.g., a short truncated BSR) is transmitted. In addition, when the size of padding bits is big enough to carry a portion of the long BSR, a truncated BSR in the long BSR format (e.g., a long truncated BSR) is transmitted.

For example, when there are data to be reported in three LCGs among eight LCGs, a total of five bytes including a one-byte MAC subheader is required for transmission in long BSR format. For example, when there are four bytes of padding, the UE 1600 may selectively transmit only two of the three pieces of BS information using the long BSR format (e.g., a long truncated BSR).

In this case, the UE 1600 determines a priority on the basis of the priority for each LCG or the highest priority among the priorities of respective LCIDs included in an LCG and may determine the number of pieces of BS information to be carried according to the padding size.

Figure 18:
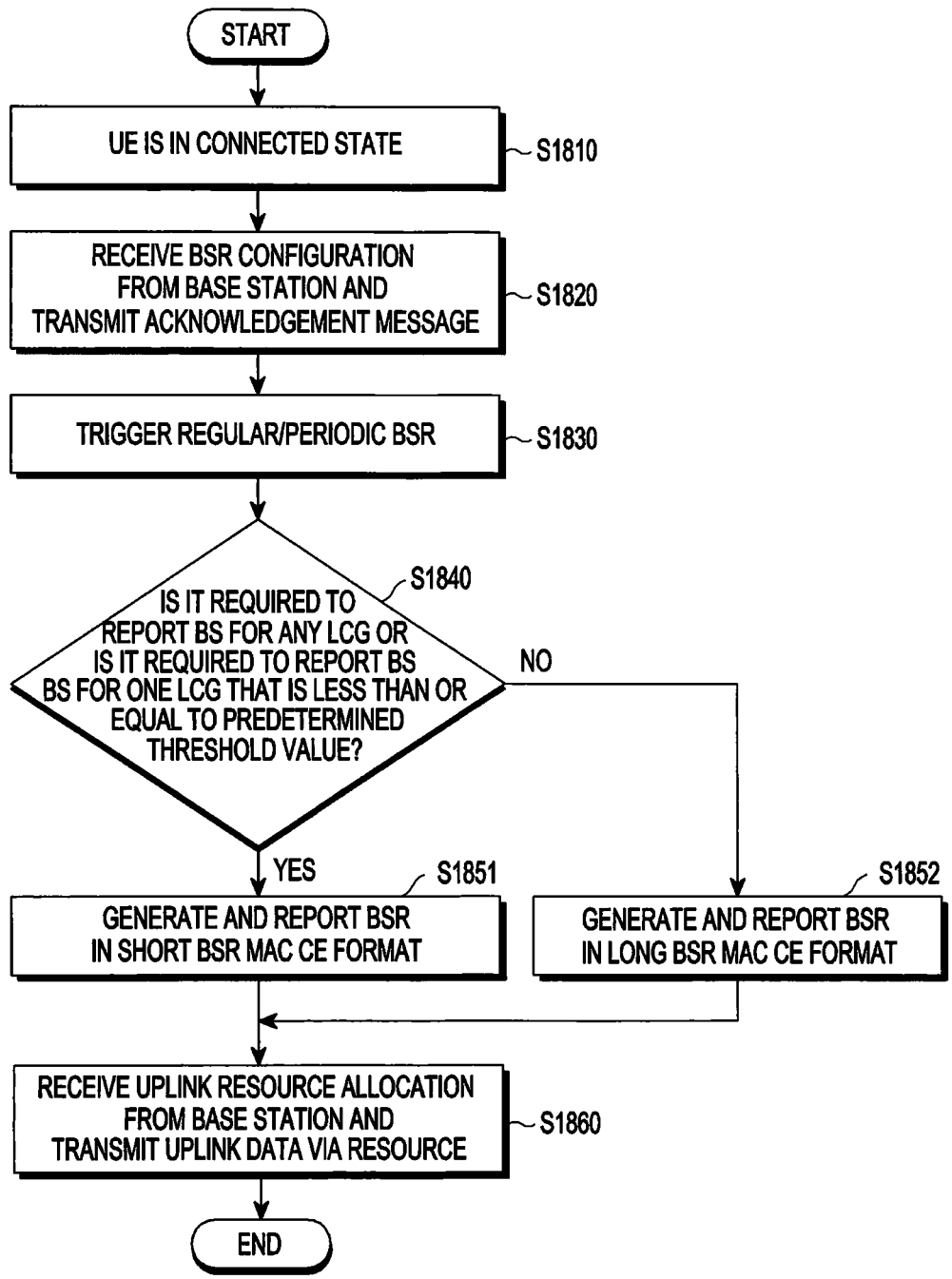
FIG. 18 is a flowchart illustrating the operation of a UE according to another embodiment of the disclosure.

FIG. 18 is a flowchart illustrating the operation of a UE according to another embodiment of the disclosure.

Specifically, FIG. 18 is the flowchart illustrating the operation of the UE 1600 when data buffer status report method 2 is used.

In FIG. 18, it is assumed that the UE 1600 is in a connected state (RRC_CONNECTED) after completing a procedure for connection to a base station 1650 (S1810). The UE 1600 receives an RRCConnectionReconfiguration message from the base station 1650 and transmits an RRC-ConnectionReconfigurationComplete message as an acknowledgement message in response thereto (S1820).

The UE 1600 receives a DRB from the RRCConnection-Reconfiguration message. The DRB configuration information includes configuration information related to PDCP, RLC, and MAC layers as described above. When a plurality of DRBs is configured, separate configuration information about each DRB is included. In addition, as MAC layer-related information, information about an LCG to which each DRB belongs may be configured.

When the amount of data to be transmitted via each DRB in a buffer in the UE satisfies a predetermined condition, the UE 1600 reports this information to the base station. This is called a BSR. Transmitted buffer status reports may be divided as follows according to the triggering condition.

Type 1: Regular BSR

BSR transmitted when a BSR retransmission timer (retxBSR-Timer) expires where the UE 1600 has data to be transmitted via an SRB/DRB belonging to an LCG BSR transmitted when there is data to be transmitted from an upper layer (RLC or PDCP layer) via the SRB/DRB belonging to the LCG and this data has a higher priority than a logical channel/radio bearer belonging to any LCG BSR transmitted when there is data to be transmitted from an upper layer (RLC or PDCP layer) via a logical channel/radio bearer belonging to the LCG and there is no data in any LCG except for this data Type 2: Periodic BSR BSR transmitted when a periodic BSR timer (periodicBSR-Timer) configured for the UE 1600 expires Type 3: Padding BSR BSR transmitted when an uplink resource is allocated and padding bits filling the remaining space after data transmission are equal to or greater than the size of a BSR MAC CE plus the size of a subheader of the BSR MAC CE When there are packets in buffers of a plurality of LCGs, a truncated BSR is transmitted.

Accordingly, when an uplink resource is allocated by the base station 1650 and padding (i.e., remaining space) occurs, the UE may transmit a long BSR/truncated BSR or a short BSR/truncated BSR according to the size of the remaining space.

When a regular BSR or a periodic BSR is triggered to be transmitted (S1830), if there is no data to be reported in the buffer or if the quantity of packets existing only in one LCG among configured LCGs for the UE 1600 is less than or equal to a predetermined threshold value (Yes in S1840), the UE 1600 generates and transmits a BSR in the short BSR format to the base station 1650 (S1851). When there are data to be reported in a plurality of LCGs among the configured LCGs for the UE 1600, there is no data to be reported, or the quantity of packets existing only in one LCG is greater than the predetermined threshold value (No in S1840), the UE 1600 generates and transmits a BSR in the long BSR format to the base station 1650 (S1852). Accordingly, the UE 1600 is allocated an uplink resource from the base station 1650 and transmits uplink data via the resource (S1860).

Figure 19:
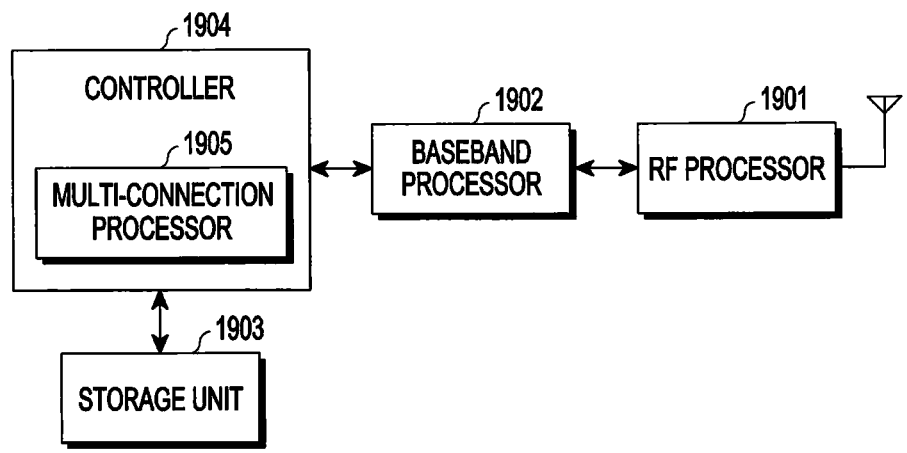
FIG. 19 is a block diagram illustrating a UE according to an embodiment of the disclosure.

FIG. 19 is a block diagram illustrating a UE according to an embodiment of the disclosure.

Referring to FIG. 19, the UE 1900 includes a radio frequency (RF) processing unit 1901, a baseband processing unit 1902, a storage unit 1903, and a controller 1904 (or at least one processor).

The RF processing unit 1901 performs a function for transmitting or receiving a signal through a wireless channel, such as band conversion and amplification of a signal. For example, the RF processing unit 1901 upconverts a baseband signal, provided from the baseband processing unit 1902, into an RF band signal to transmit the RF band signal through an antenna. Further, the RF processing unit 1901 downconverts an RF band signal, received through the antenna, into a baseband signal. For example, the RF processing unit 1901 may include a transmission filter, a reception filter, an amplifier, a mixer, an oscillator, a digital-to-analog converter (DAC), and an analog-to-digital converter (ADC).

Although FIG. 19 shows only one antenna, the UE 1900 may include a plurality of antennas. In addition, the RF processing unit 1901 may include a plurality of RF chains. Further, the RF processing unit 1901 may perform beamforming. For example, the RF processing unit 1m-10 may adjust the phase and strength of each of signals transmitted and received through a plurality of antennas or antenna elements, thereby performing beamforming. The RF processing unit 1901 may perform MIMO and may receive a plurality of layers when performing MIMO.

The baseband processing unit 1902 performs a function of converting a baseband signal and a bit stream according to the physical-layer specification of a system. For example, in data transmission, the baseband processing unit 1902 encodes and modulates a transmission bit stream, thereby generating complex symbols. In data reception, the baseband processing unit 1902 demodulates and decodes a baseband signal, provided from the RF processing unit 1m-10, thereby reconstructing a reception bit stream. For example, according to OFDM, in data transmission, the baseband processing unit 1902 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processing unit 1902 divides a baseband signal, provided from the RF processing unit 1901, into OFDM symbols, reconstructs signals mapped to subcarriers through a fast Fourier transform (FFT), and reconstructs a reception bit stream through demodulation and decoding.

The baseband processing unit 1902 and the RF processing unit 1901 transmit and receive signals. Accordingly, the baseband processing unit 1902 and the RF processing unit 1901 may be referred to as a transmitter, a receiver, a transceiver, or a communication unit. At least one of the baseband processing unit 1902 and the RF processing unit 1901 may include a plurality of communication modules to support a plurality of different radio access technologies.

Further, at least one of the baseband processing unit 1902 and the RF processing unit 1901 may include different communication modules for processing signals in different frequency bands. For example, the different radio access technologies may include a wireless LAN (for example, IEEE 802.11), a cellular network (for example, an LTE network), and the like. In addition, the different frequency bands may include a super high frequency (SHF) band (e.g., 2.NRHz, NRhz, 3G to 30 GHz) and a millimeter wave band (for example, 60 GHz).

The storage unit 1903 stores data, such as a default program, an application, and configuration information for operating the UE 1900. In particular, the storage unit 1903 may store information on a second access node performing wireless communication using a second radio access technology. The storage unit 1903 provides stored data upon request from the controller 1904.

The controller 1904 controls overall operations of the UE 1900. For example, the controller 1904 transmits and receives signals through the baseband processing unit 1902 and the RF processing unit 1901. Further, the controller 1904 records and reads data in the storage unit 1904. To this end, the controller 1904 may include at least one processor. For example, the controller 1904 may include a communication processor (CP) to perform control for communication and an application processor (AP) to control an upper layer, such as an application. Further, the controller 1904 may include a multi-connection processing unit 1904-1

Figure 20:
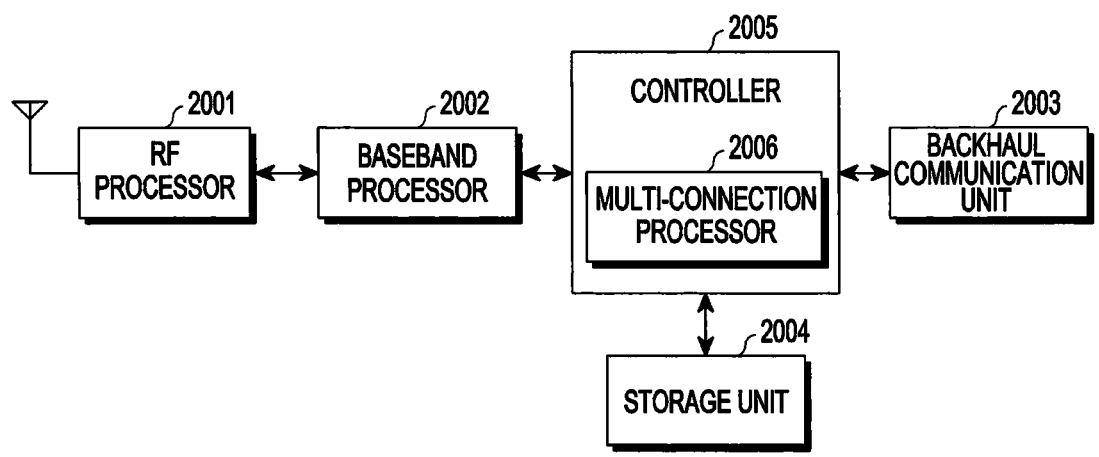
FIG. 20 is a block diagram illustrating a base station according to an embodiment of the disclosure.

FIG. 20 is a block diagram illustrating a base station according to an embodiment of the disclosure.

Referring to FIG. 20, the base station 2000 includes an RF processing unit 2001, a baseband processing unit 2002, a backhaul communication unit 2003, a storage unit 2004, and a controller 2005.

The RF processing unit 2001 performs a function for transmitting or receiving a signal through a wireless channel, such as band conversion and amplification of a signal. For example, the RF processing unit 2001 upconverts a baseband signal, provided from the baseband processing unit 2002, into an RF band signal to transmit the RF band signal through an antenna. Further, the RF processing unit 2001 downconverts an RF band signal, received through the antenna, into a baseband signal. For example, the RF processing unit 2001 may include a transmission filter, a reception filter, an amplifier, a mixer, an oscillator, a DAC, and an ADC.

Although FIG. 20 shows only one antenna, a first access node may include a plurality of antennas. In addition, the RF processing unit 2001 may include a plurality of RF chains. Further, the RF processing unit 2001 may perform beamforming. The RF processing unit 2001 may adjust the phase and strength of each of signals transmitted and received through a plurality of antennas or antenna elements, thereby performing beamforming. The RF processing unit 2001 may transmit one or more layers, thereby performing downlink MIMO.

The baseband processing unit 2002 performs a function of converting a baseband signal and a bit stream according to the physical-layer specification of a first radio access technology. For example, in data transmission, the baseband processing unit 2002 encodes and modulates a transmission bit stream, thereby generating demodulated (complex) symbols. In data reception, the baseband processing unit 2002 demodulates and decodes a baseband signal, provided from the RF processing unit 2001, thereby reconstructing a reception bit stream.

For example, according to OFDM, in data transmission, the baseband processing unit 2002 generates complex symbols by encoding and modulating a transmission bit stream, maps the complex symbols to subcarriers, and constructs OFDM symbols through an IFFT and CP insertion. In data reception, the baseband processing unit 2002 divides a baseband signal, provided from the RF processing unit 2001, into OFDM symbols, reconstructs signals mapped to subcarriers through an FFT, and reconstructs a reception bit stream through demodulation and decoding.

As described above, the baseband processing unit 2002 and the RF processing unit 2001 transmit and receive signals. Accordingly, the baseband processing unit 2002 and the RF processing unit 2001 may be referred to as a transmitter, a receiver, a transceiver, a communication unit, or a wireless communication unit.

The backhaul communication unit 2003 provides an interface for performing communication with other nodes in a network. That is, the backhaul communication unit 2003 may convert a bit stream, transmitted from the main base station 2000 to another node, for example, a secondary base station or a core network, into a physical signal. Also, the backhaul communication unit 2003 may convert a physical signal, received from the other node, into a bit stream.

The storage unit 2004 stores data, such as a default program, an application, and configuration information for operating the main base station. In particular, the storage unit 2004 may store information on a bearer allocated to a connected UE, a measurement result reported from a connected UE, and the like. In addition, the storage unit 2004 may store information as a criterion for determining whether to provide or stop a multi-connection to a UE. The storage unit 2004 provides stored data upon request from the controller 2005 (or at least one processor).

The controller 2005 controls overall operations of the main base station 2000. For example, the controller 2005 transmits and receives signals through the baseband processing unit 2002 and the RF processing unit 2001 or through the backhaul communication unit 2003. Further, the controller 2005 records and reads data in the storage unit 2004. To this end, the controller 2005 may include at least one processor.

According to an embodiment of the disclosure, the UE 1900 may receive a detailed configuration for each DRB from the base station 2000 and accordingly, if BSR transmission is triggered, may determine, generate, and transmit a BSR format to the base station according to configured information, thereby reporting the buffer status of the UE.

Figure 21:
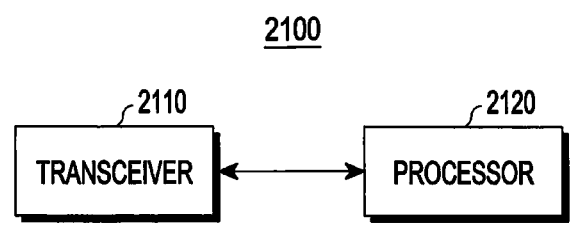
FIG. 21 is a block diagram illustrating a UE according to an embodiment of the disclosure.

FIG. 21 is a block diagram illustrating a UE according to an embodiment of the disclosure.

Referring to FIG. 21, the UE 2100 includes a transceiver 2110 and a processor 2120.

The transceiver 2110 may transmit and receive data to and from a base station.

The processor 2120 controls the UE 2100 overall. The processor 2120 may control the transceiver 2110 to receive backoff-related information from the base station and may perform random access on the basis of the received backoff-related information. The processor 2120 may control the transceiver to transmit a preamble about system information to the base station and to receive a random access response corresponding to the preamble. The processor 2120 may control the transceiver 2110 to transmit buffer status information and to receive uplink resource allocation information configured on the basis of the buffer status information from the base station.

Figure 22:
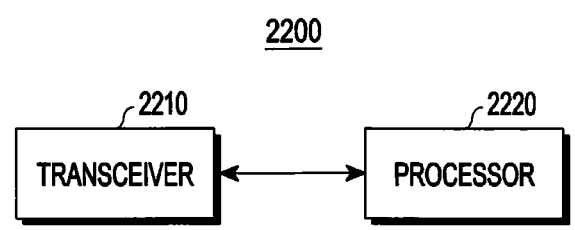
FIG. 22 is a block diagram illustrating a base station according to an embodiment of the disclosure.

FIG. 22 is a block diagram illustrating a base station according to an embodiment of the disclosure.

Referring to FIG. 22, the UE 2200 includes a transceiver 2210 and a processor 2220.

The transceiver 2210 may transmit and receive data to and from a UE.

The processor 2220 controls the base station 2200 overall. The processor 2220 may control the transceiver 2210 to transmit backoff-related information from the UE. In this case, the UE may perform random access on the basis of the backoff-related information. The processor 2220 may control the transceiver to receive a preamble about system information from the UE and to transmit a random access response corresponding to the preamble. The processor 2220 may control the transceiver 2210 to receive buffer status information from the UE and to transmit uplink resource allocation information configured on the basis of the buffer status information.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a user equipment (UE), in a communication system, the method comprising:
   receiving, from a base station, information associated with an uplink resource allocation;
   identifying a number of padding bits based on the information associated with the uplink resource allocation;
   in case that the number of padding bits is smaller than a number of bits for transmission of a long buffer status report (BSR), identifying whether the number of padding bits is enough to transmit a long truncated BSR;
   transmitting, to the base station, a short truncated BSR, in case that the number of padding bits is not enough to transmit the long truncated BSR; and
   transmitting, to the base station, the long truncated BSR, in case that the number of padding bits is enough to transmit the long truncated BSR,
   wherein the long truncated BSR includes a bit map for a plurality of logical channel groups (LCGs) and information on a buffer size for at least one LCG among the plurality of LCGs, and
   wherein a number of the information on the buffer size for the at least one LCG is determined based on the number of padding bits.

2. The method of claim 1,
   wherein each bit of the bit map corresponds to each LCG, respectively,
   wherein the each bit indicates whether the each LCG has data available,
   wherein a bit of the bitmap is set to 0, in case that a LCG corresponding to the bit of the bitmap does not have data available, and
   wherein the bit of the bitmap is set to 1, in case that the LCG corresponding to the bit of the bitmap has data available.

3. The method of claim 1,
   wherein the long truncated BSR further includes a plurality of information on the buffer size,
   wherein each of the plurality of information on the buffer size corresponds to the each LCG respectively, and wherein a number of the plurality of information on the buffer size is determined based on a priority associated with a logical channel in the each LCGs.

4. The method of claim 1,
wherein the short truncated BSR includes a short truncated BSR medium access control (MAC) subheader and a short truncated BSR MAC control element (CE), and
wherein the long truncated BSR includes a long truncated BSR MAC subheader and a long truncated BSR MAC CE.

5. A method for performed by a base station, in a communication system, the method comprising:
transmitting, to a user equipment (UE), information associated with an uplink resource allocation;
receiving, from the UE, a short truncated buffer status report (BSR), in case that a number of padding bits is smaller than a number of bits for transmission of a long BSR and the number of padding bits is not enough to transmit a long truncated BSR; and
receiving, from the UE, the long truncated BSR, in case that the number of padding bits is smaller than the number of bits for transmission of the long BSR and the number of padding bits is enough to transmit the long truncated BSR,
wherein the long truncated BSR includes a bit map for a plurality of logical channel groups (LCGs) and information on a buffer size for at least one LCG among the plurality of LCGs, and
wherein a number of the information on the buffer size for the at least one LCG is based on the number of padding bits.

6. The method of claim 5,
wherein each bit of the bit map corresponds to each LCG, respectively,
wherein the each bit indicates whether the each LCG has data available,
wherein a bit of the bitmap is set to 0, in case that a LCG corresponding to the bit of the bitmap does not have data available, and
wherein the bit of the bitmap is set to 1, in case that the LCG corresponding to the bit of the bitmap has data available.

7. The method of claim 5,
wherein the long truncated BSR further includes a plurality of information on the buffer size,
wherein each of the plurality of information on the buffer size corresponds to the each LCG respectively, and
wherein a number of the plurality of information on the buffer size is based on a priority associated with a logical channel in the each LCGs.

8. The method of claim 5,
wherein the short truncated BSR includes a short truncated BSR medium access control (MAC) subheader and a short truncated BSR MAC control element (CE), and
wherein the long truncated BSR includes a long truncated BSR MAC subheader and a long truncated BSR MAC CE.

9. A user equipment (UE) in a communication system, the UE comprising:
a transceiver; and
a processor coupled with the transceiver configured to:
receive, from a base station via the transceiver, information associated with an uplink resource allocation,
identify a number of padding bits based on the information associated with the uplink resource allocation,
in case that the number of padding bits is smaller than a number of bits for transmission of a long buffer status report (BSR), identify whether the number of padding bits is enough to transmit a long truncated BSR,
transmit, to the base station via the transceiver, a short truncated BSR, in case that the number of padding bits is not enough to transmit the long truncated BSR, and
transmit, to the base station via the transceiver, the long truncated BSR, in case that the number of padding bits is enough to transmit the long truncated BSR,
wherein the long truncated BSR includes a bit map for a plurality of logical channel groups (LCGs) and information on a buffer size for at least one LCG among the plurality of LCGs, and
wherein a number of the information on the buffer size for the at least one LCG is determined based on the number of padding bits.

10. The UE of claim 9, wherein each bit of the bit map corresponds to each LCG, respectively,
wherein the each bit indicates whether the each LCG has data available,
wherein a bit of the bitmap is set to 0, in case that a LCG corresponding to the bit of the bitmap does not have data available, and
wherein the bit of the bitmap is set to 1, in case that the LCG corresponding to the bit of the bitmap has data available.

11. The UE of claim 9, wherein the long truncated BSR further includes a plurality of information on the buffer size,
wherein each of the plurality of information on the buffer size corresponds to the each LCG respectively, and
wherein a number of the plurality of information on the buffer size is determined based on a priority associated with a logical channel in the each LCGs.

12. The UE of claim 9,
wherein the short truncated BSR includes a short truncated BSR medium access control (MAC) subheader and a short truncated BSR MAC control element (CE), and
wherein the long truncated BSR includes a long truncated BSR MAC subheader and a long truncated BSR MAC CE.

13. A base station in a communication system, the base station comprising:
a transceiver; and
a processor coupled with the transceiver and configured to:
transmit, to a user equipment (UE) via the transceiver, information associated with an uplink resource allocation,
receive, from the UE via the transceiver, a short truncated buffer state report (BSR), in case that a number of padding bits is smaller than a number of bits for transmission of a long BSR and the number of padding bits is not enough to transmit a long truncated BSR,
receive, from the UE via the transceiver, the long truncated BSR, in case that the number of padding bits is smaller than the number of bits for transmission of the long BSR and the number of padding bits is enough to transmit the long truncated BSR, wherein the long truncated BSR includes a bit map for a plurality of logical channel groups (LCGs) and information on a buffer size for at least one LCG among the plurality of LCGs, and wherein a number of the information on the buffer size for the at least one LCG is based on the number of padding bits.

14. The base station of claim 13, wherein each bit of the bit map corresponds to each LCG, respectively, wherein the each bit indicates whether the each LCG has data available, wherein a bit of the bitmap is set to 0, in case that a LCG corresponding to the bit of the bitmap does not have data available, and wherein the bit of the bitmap is set to 1, in case that the LCG corresponding to the bit of the bitmap has data available.

15. The base station of claim 13, wherein the long truncated BSR further includes a plurality of information on the buffer size, wherein each of the plurality of information on the buffer size corresponds to the each LCG respectively, and wherein a number of the plurality of information on the buffer size is based on a priority associated with a logical channel in the each LCGs.

16. The base station of claim 13, wherein the short truncated BSR includes a short truncated BSR medium access control (MAC) subheader and a short truncated BSR MAC control element (CE), and wherein the long truncated BSR includes a long truncated BSR MAC subheader and a long truncated BSR MAC CE.

* * * * *